(12) United States Patent
Maekawa

(10) Patent No.: US 6,266,497 B1
(45) Date of Patent: Jul. 24, 2001

(54) IMAGE FORMING APPARATUS HAVING PREDICTION OF DEVELOPMENT TIME AND MODE CHANGE

(75) Inventor: Shinichiro Maekawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/396,879

(22) Filed: Sep. 16, 1999

(30) Foreign Application Priority Data

Sep. 21, 1998 (JP) .................................................. 10-283601
Oct. 1, 1998 (JP) .................................................. 10-280011
Aug. 31, 1999 (JP) .................................................. 11-245188

(51) Int. Cl.$^7$ .................................................. G03G 15/00
(52) U.S. Cl. .................................................. 399/85; 358/1.17
(58) Field of Search .................................................. 399/302, 303, 399/308, 85; 358/300, 296, 1.16, 1.17; 347/139, 262, 264

(56) References Cited

U.S. PATENT DOCUMENTS

| | | | |
|---|---|---|---|
| 5,274,461 | * 12/1993 | Mitsuhashi | 358/296 |
| 5,383,012 | * 1/1995 | Yamada | 399/43 |
| 5,668,937 | * 9/1997 | Shimizu | 395/115 |
| 5,668,938 | * 9/1997 | Tomory | 395/115 |
| 5,673,115 | * 9/1997 | Arimoto | 358/296 |
| 5,696,853 | 12/1997 | Kawana et al. | 382/299 |
| 5,760,811 | 6/1998 | Seto et al. | 347/131 |
| 5,764,867 | * 6/1998 | Sato | 395/115 |
| 5,920,686 | * 7/1999 | Mitani | 395/115 |
| 5,940,653 | 8/1999 | Maekawa et al. | 399/9 |

FOREIGN PATENT DOCUMENTS 5-000557 * 1/1993 (JP) .
7-171999 * 7/1995 (JP) .
10-305639 * 11/1998 (JP) .

* cited by examiner

Primary Examiner—Robert Beatty
(74) Attorney, Agent, or Firm—Fitzpatrick, Cella, Harper & Scinto

(57) ABSTRACT

An image forming apparatus which forms images onto a plurality of pages has prediction unit which predicts a development processing time to develop a band of intermediate data based on print data to a bit map image and a controller which switches from a first mode to form one page or second mode to form images of a plurality of pages depending on the prediction information calculated by the prediction device. Thus the throughput can be increased by controlling the print data and a band development schedule.

36 Claims, 24 Drawing Sheets

FIG. 15

PAGE N

PAGE M

BAND INFORMATION AREA BI

| BAND ID (BI-1) | DEVELOPMENT TIME (BI-2) | MEM ASSIGNMENT (BI-3) |
|---|---|---|
| A1 | OK | M1 |
| A2 | OK | M2 |
| A3 | OK | M1 |
| A4 | OK | M2 |
| A5 | NG | M3 |
| A6 | OK | M1 |
| | | |
| B1 | OK | M2 |
| B2 | OK | M1 |
| B3 | NG | M4 |
| B4 | OK | M2 |
| B5 | NG | M5 |
| B6 | OK | M1 |

FIG. 22

MEMORY MAP OF MEM MEDIUM (FD/CD-ROM)

| DIRECTORY |
|---|
| 1ST DATA PROCESSING PROGRAM PROGRAM CODES FOR FLOWCHART OF FIGS. 10–12 |
| 2ND DATA PROCESSING PROGRAM PROGRAM CODES FOR FLOWCHART OF FIGS. 13–14 |
| 3RD DATA PROCESSING PROGRAM PROGRAM CODES FOR FLOWCHART OF FIGS. 18–20 |
| 4TH DATA PROCESSING PROGRAM PROGRAM CODES FOR FLOWCHART OF FIG. 21 |
| |

INTERMEDIATE TRANSFER MEMBER

↓ TRANSFER

PAPER

INTERMEDIATE TRANSFER MEMBER

↓ TRANSFER

PAPER

IMAGE FORMING APPARATUS HAVING PREDICTION OF DEVELOPMENT TIME AND MODE CHANGE

BACKGROUND OF THE INVENTION

1. Field of the Invention

The invention relates to an image forming apparatus, an image forming method, and a storage medium and, more particularly, to an image forming apparatus, an image forming method, and a storage medium which are suitable in case of performing a prevention of a color deviation or the like in a printer such as a color laser beam printer.

2. Related Background Art

In recent years, page printers mainly including a laser beam printer have rapidly been developed. Further, recently, a number of page printers which can output a color image have also been proposed and put into practical use as products. A color laser beam printer forms a full color image by overlaying toner of four colors (Y: yellow, M: magenta, C: cyan, K: black) by a well-known electrophotographing process. Various processes to realize such a full color image have been proposed.

Among them, for example, as shown in FIG. 23, there is an intermediate transfer system such that a toner image is formed from a latent image on a photosensitive drum, the toner image is once transferred onto an intermediate transfer member, and toner images of four colors are overlaid onto the intermediate transfer member, and after that, the toner images of four colors are transferred in a lump onto a paper and fixed, thereby forming an image. According to the intermediate transfer system, since the intermediate transfer member is physically fixed, there is an advantage such that a color deviation of four colors can be prevented easier as compared with the case of a system for transferring the toner images one color by one onto the paper.

There is also an advantage such that since it is sufficient to transfer the toner images onto the paper only once, a path of a paper can be formed in a straight line and the toner images can be easily transferred onto a medium such as OHP, thick paper, or the like which is difficult to be wrapped around the transfer drum.

FIGS. 24A and 24B are diagrams showing the relation between the intermediate transfer member and a paper size in the image forming apparatus shown in FIG. 23. FIG. 24A corresponds to a case where an image is formed onto the whole surface of the intermediate transfer member. FIG. 24B corresponds to a case where an image is formed onto a part of the intermediate transfer member.

As shown in FIGS. 24A and 24B, the image forming method of the intermediate transfer system has a problem such that the intermediate transfer member with the size corresponding to the maximum paper size is necessary. In case of forming an image on a page unit basis, even in case of the printing of any size, the maximum number of print copies per minute cannot be set to be larger than that corresponding to the maximum paper size.

SUMMARY OF THE INVENTION

The invention is made in consideration of the above problems and it is an object of the invention to provide an image forming apparatus, an image forming method, and a storage medium which can maximize a print throughput of the intermediate transfer system.

To accomplish the above object, there is provided an image forming apparatus comprising: image forming means which can form images of a plurality of pages based on print data received from an external apparatus in an image forming area; predicting means for calculating prediction information, on a page unit basis, to predict a development processing time to develop intermediate data based on the print data to a bit map image; and control means for switching a first forming mode to form an image of one page by the image forming means and a second forming mode to form images of a plurality of pages by the image forming means on the basis of the prediction information which is calculated by the predicting means, thereby allowing an image formation to be performed.

To accomplish the above object, according to the invention, there is provided an image forming apparatus comprising: image forming means which can form images of a plurality of pages based on print data received from an external apparatus to an image forming area; predicting means for calculating prediction information, on a page unit basis, to predict a development processing time for developing intermediate data based on the print data to a bit map image; and control means for switching a first forming mode to output a signal to request an image formation after completion of a development of a band in which a development processing time of the band is later than an image formation processing speed in the image forming means and a second forming mode to start the development of the band in which the development processing time of the band is later than the image formation processing speed in the image forming means after the signal to request the image formation was outputted on the basis of the prediction information calculated by the predicting means, thereby allowing an image formation to be performed.

To accomplish the above object, the image forming apparatus is accomplished by an image forming method and a computer-readable storage medium which stores a program for realizing such a method.

BRIEF DESCRIPTION OF THE DRAWINGS

FIG. 15 is a diagram for explaining the raster data formation processing operation in a 2-page mode by the controller shown in FIG. 2;

FIG. 22 is a diagram for explaining a memory map in a storage medium to store various data processing programs which can be read out by a print system to which the print control apparatus according to the invention can be applied;

DETAILED DESCRIPTION OF THE PREFERRED EMBODIMENTS

Embodiments of the invention will now be described hereinbelow with reference to the drawings.

First Embodiment

Figure 2:
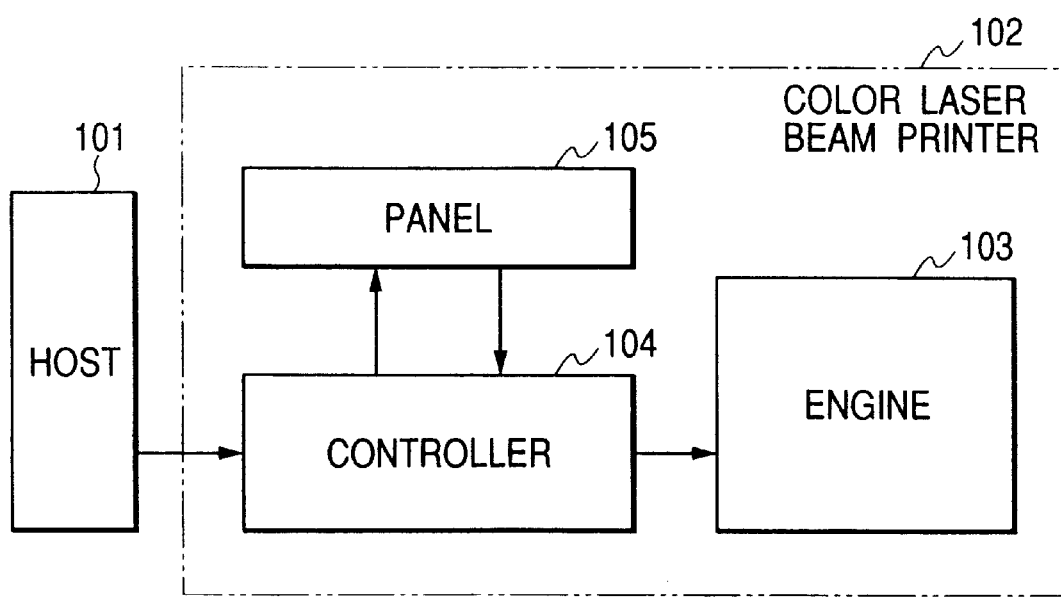
FIG. 2 is a block diagram showing a whole construction of a system including the color laser beam printer according to the first and second embodiments of the invention.

FIG. 2 is a block diagram showing a whole construction of a system including a color laser beam printer according to the first embodiment of the invention. The system including the color laser beam printer according to the first embodiment of the invention is schematically constructed by external apparatus 101 such as a host computer (hereinafter, simply referred to as "host 101") and a color laser beam printer 102. Further, the color laser beam printer 102 comprises an engine 103, a controller 104, and a panel 105.

A construction of each of the above units will now be described in detail. The host 101 as an external apparatus sends code data and image data (R: red, G: green, B: blue, Y: yellow, M: magenta, C: cyan, Bk: black) to the color laser beam printer 102. The engine 103 of the color laser beam printer 102 actually forms latent images onto a photosensitive drum every dot data of four colors of Y, M, C, and Bk, thereby overlaying four colors of Y, M, C, and Bk onto the paper and thermally fixing them and printing.

The controller 104 of the color laser beam printer 102 is connected to the engine 103, receives the code data and image data (RGB, YMCBk) sent from the host 101, forms page information comprising dot data of respective colors of Y, M, C, and Bk on the basis of those data, and sequentially transmits the dot data to the engine 103. The panel 105 of the color laser beam printer 102 is used when a predetermined operation is designated to the color laser beam printer 102 by operating the panel 105 by the operator (user).

The controller 104 and engine 103 in the color laser beam printer 102 are connected by a predetermined video interface and exchange information by a serial communication of a command/status of, for example, an 8-bit unit.

Figure 3:
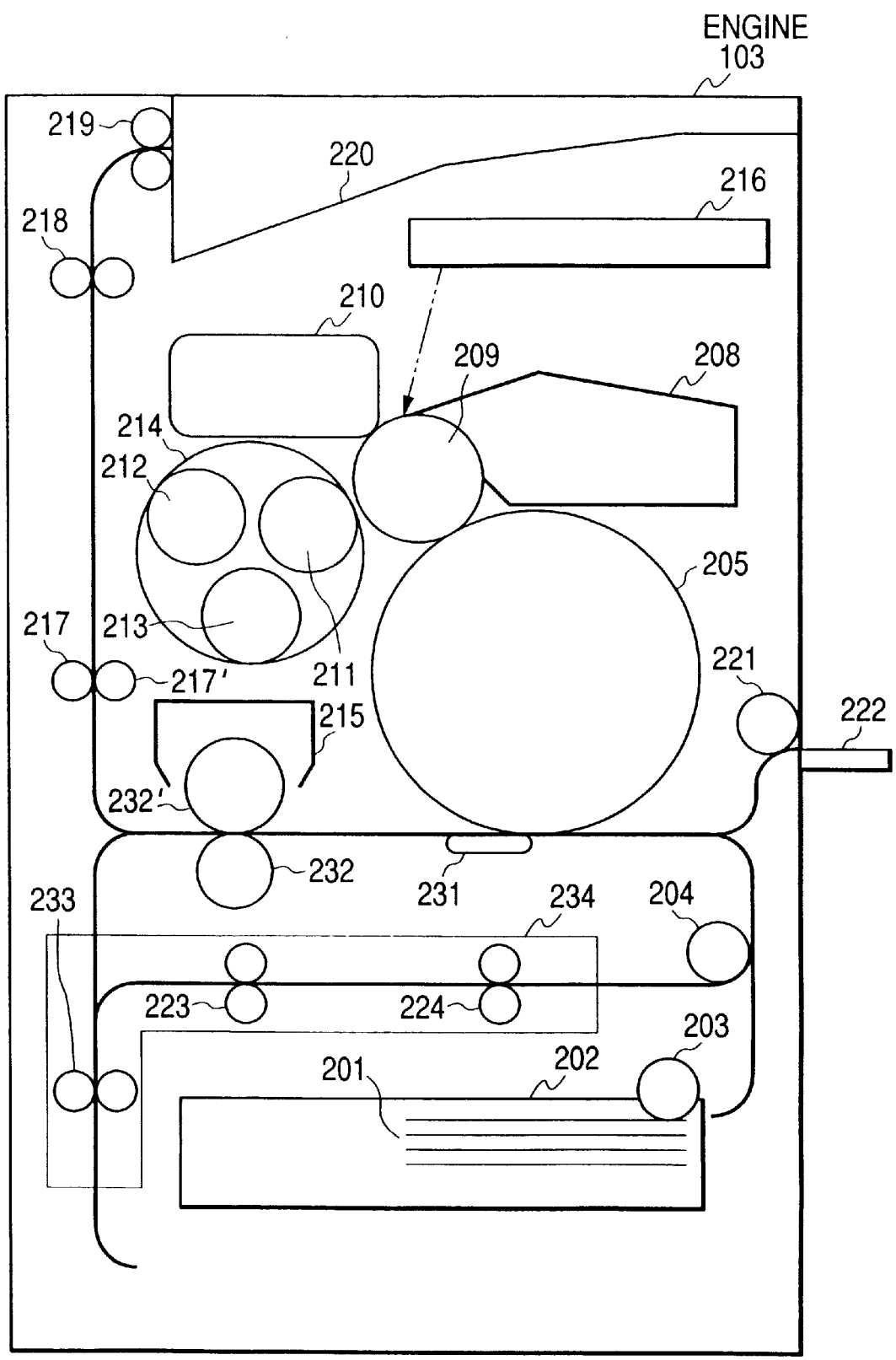
FIG. 3 is a consructional diagram showing a construction of an engine of the color laser beam printer according to the first and second embodiments of the invention.

FIG. 3 is a constructional diagram showing a construction of the engine 103 of the color laser beam printer 102 according to the first embodiment of the invention. The engine 103 of the color laser beam printer 102 according to the first embodiment of the invention comprises: a paper cassette 202; a cassette paper feed clutch 203; a paper feed roller 204; an intermediate transfer drum 205; a drum cartridge 208; a photosensitive drum 209; a black (Bk) toner developing unit 210; a yellow (Y) toner developing unit 211; a magenta (M) toner developing unit 212; a cyan (C) toner developing unit 213; a YMC developing unit supporting unit 214; a fixing heater 215; a scanner unit 216; a secondary transfer roller 231; fixing rollers 217 and 232; conveying rollers 218 and 219; a paper deliver tray 220; a manual paper feed clutch 221; a paper feed base 222; and a reverse paper re-feed unit 234 having conveying rollers 223, 224, and 233.

A construction of each of the above units will now be described in detail together with the operation. The paper cassette 202 holds papers 201 as recording media. The cassette paper feed clutch 203 separates only one top paper among the papers 201 put on the paper cassette 202. A cam to transport a front edge portion of the separated paper to the position of the paper feed roller 204 by driving means (not shown) intermittently rotates every paper feed, thereby feeding one sheet of paper in correspondence to one rotation. When the paper is transported by the cassette paper feed clutch 203, the paper feed roller 204 rotates while slightly pressing the paper 201, thereby transporting the paper 201. The paper feed base 222 and manual paper feed clutch 221 enables not only the paper feed from the paper cassette 202 but also the manual paper feed to feed the papers one by one from the paper feed base 222.

The latent image is formed on the surface of the photosensitive drum 209 loaded in the drum cartridge 208 and developed. The black toner developing unit 210, yellow toner developing unit 211, magenta toner developing unit 212, and cyan toner developing unit 213 are supported to the YMC developing unit supporting unit 214 and each of them performs the development of each corresponding color. The YMC developing unit supporting unit 214 rotates and transports the developing unit of desired color toner to a position where the image can be developed on the photosensitive drum 209. A laser driver (not shown) equipped in the scanner unit 216 forms an image onto the photosensitive drum 209 while turning on/off a semiconductor laser (not shown) in accordance with dot data which is transmitted from the controller 104 in FIG. 2 and scans the laser in the main scanning direction, thereby forming a latent image onto the mains canning line.

The intermediate transfer drum 205 rotates at a predetermined speed during the printing and the toner image formed on the photosensitive drum 209 is transferred onto the intermediate transfer drum 205. The latent image on the photosensitive drum 209 is visualized as a toner image by the black toner developing unit 210, yellow toner developing unit 211, magenta toner developing unit 212, and cyan toner developing unit 213 in parallel with the image formation. Further, the visualized toner image is transferred onto the intermediate transfer drum 205 which rotates in parallel with the photosensitive drum 209, so that a toner image of a size corresponding to one page is formed onto the intermediate transfer drum 205. In case of a monochromatic (single color) mode, a toner image of one page (hereinafter, referred to as a plane) of one color is formed on the intermediate transfer drum 205. In a full color mode, four planes of the black toner developing unit 210, yellow toner developing unit 211, magenta toner developing unit 212, and cyan toner developing unit 213 are overlaid and formed on the intermediate transfer drum 205.

When the paper 201 enters a gap between the intermediate transfer drum 205 and secondary transfer roller 231, charges are applied to the secondary transfer roller 231, so that the secondary transfer roller 231 transfers (secondary transfer) the toner image on the intermediate transfer drum 205 onto the paper 201 inserted between the drum 205 and roller 231. The fixing heater 215 and fixing rollers 232 and 232' heat the toner image on the paper 201, thereby fixing. When the paper 201 is subjected to the secondary transfer, it is further conveyed, the toner image is heated and fixed by the fixing rollers 217 and 217', and the resultant paper is delivered onto the paper deliver tray 220 through the conveying rollers 218 and 219.

In the color laser beam printer 102 in the embodiment, the processes of the formation and transfer of the latent image are sequentially performed in order of yellow, magenta, cyan, and black. Each of the foregoing yellow toner developing unit 211, magenta toner developing unit 212, cyan toner developing unit 213, and black toner developing unit 210 is a casing of a cassette type and is detachable from the main body. Therefore, reference numeral 211 denotes a Y cartridge, 212 an M cartridge, 213 a C cartridge, and 210 a K cartridge hereinbelow.

The engine 103 in FIG. 2 can select either the paper deliver tray 220 or the reverse paper re-feed unit 234 as a transportation destination of the paper 201 which was completely fixed. Either the tray 220 or the unit 234 is designated from the controller 104 by the serial communication. When the paper 201 enters the reverse paper re-feed unit 234, it is once conveyed in the direction of the conveying roller 233. When a sensor (not shown) detects a rear edge of the paper, the engine 103 reversely rotates the conveying roller 233, thereby transporting the paper 201 toward the conveying rollers 223 and 224. If a double-sided paper re-feed unit is designated as a paper feed port, since the paper is again fed to the paper feed roller 204 in a state where the paper surface is reversed, a double-sided print can be performed via the foregoing printing process.

As mentioned above, the engine 103 of the color laser beam printer 102 in the embodiment forms the toner image of one page onto the intermediate transfer drum 205, thereby realizing the full color print or monochromatic print. Therefore, an outer circumferential length of the intermediate transfer drum 205 is equal to or longer than a length of major side of the printable maximum paper size. Thus, to improve a print throughput by narrowing a conveying interval of the paper, in case of a paper having a length that is equal to or shorter than ½ of the maximum paper length, the apparatus has a mode such that toner images of two pages are formed on the intermediate transfer drum 205 and the two sheets of papers are continuously fed, thereby continuously printing the papers as many as two pages.

Hereinbelow, the continuous print of two pages mentioned above is referred to as a 2-page mode and the ordinary print is called a 1-page mode (or normal printing mode). In the embodiment, the maximum paper size is set to, for example, a size that is two or more times as large as a size of the A4 landscape feed and in case of the A4 landscape feed, the toner images of two pages can be continuously printed.

Figure 4:
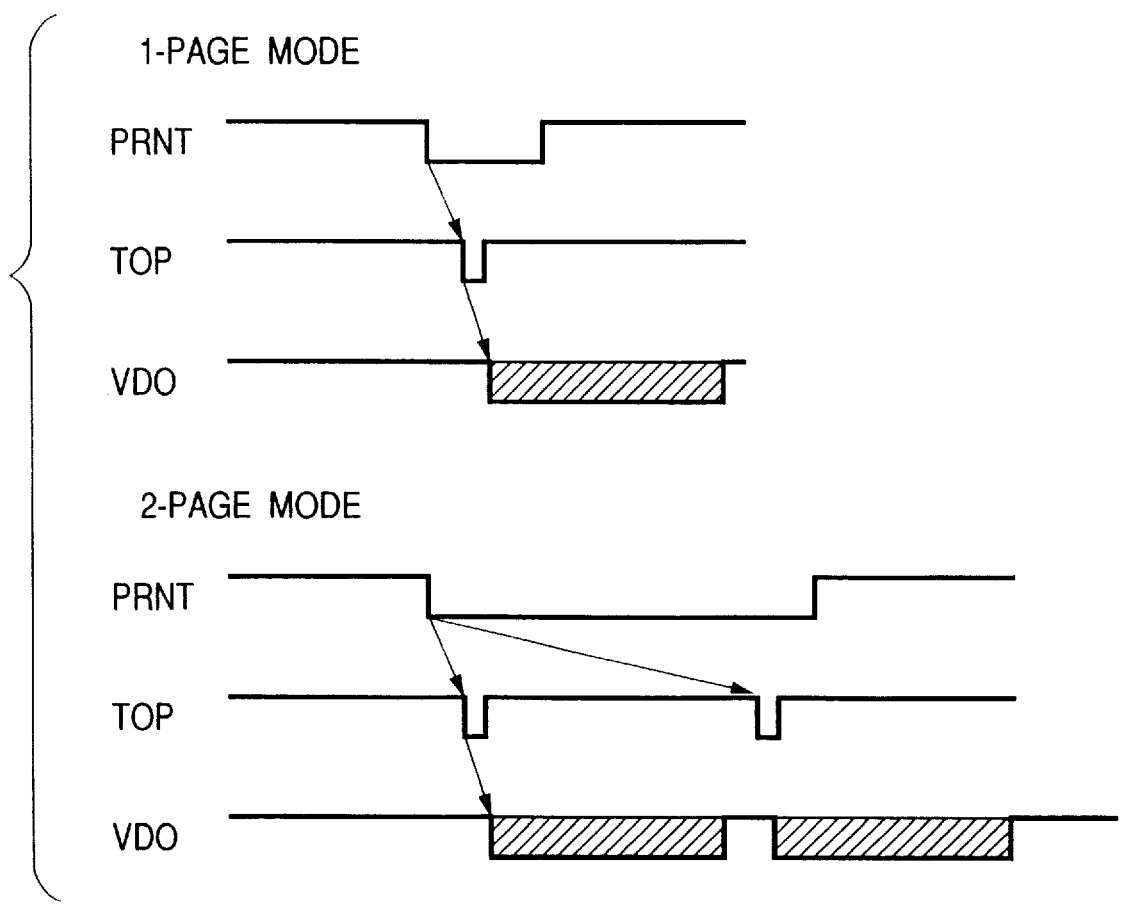
FIG. 4 is an explanatory diagram of an interface of the engine and the controller of the color laser beam printer according to the first and second embodiments of the invention.
Figure 5:
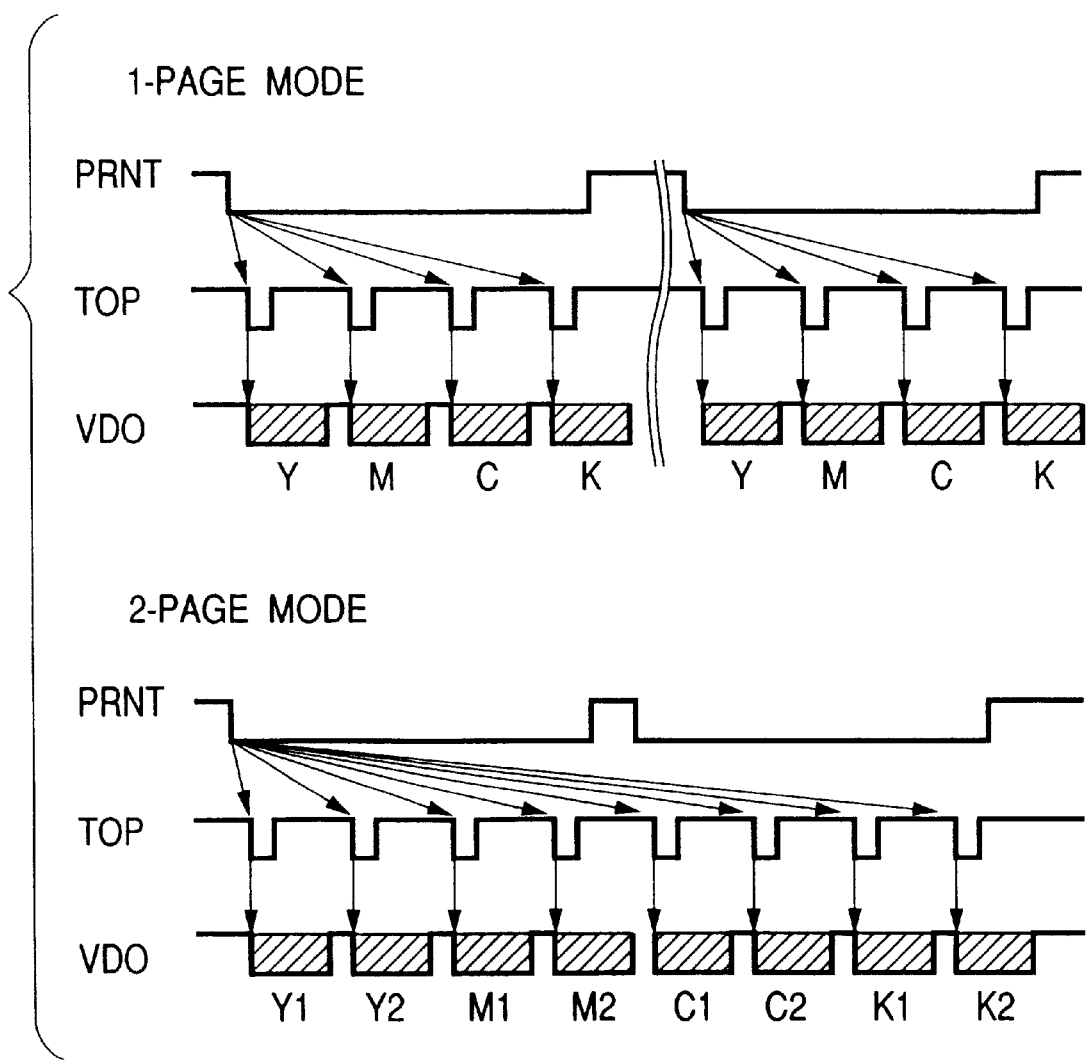
FIG. 5 is an explanatory diagram of the interface of the engine and the controller of the color laser beam printer according to the first and second embodiments of the invention.

FIGS. 4 and 5 are diagrams showing print protocol between the engine 103 and controller 104 of the color laser beam printer 102 according to the first embodiment of the invention by timing charts of interface signals. In the diagram, PRNT denotes a signal which is used when the controller 104 requests a print start, TOP indicates a timing signal which is used when the engine 103 requests image data (video signal) to the controller 104, VDO shows image data. The image data VDO of one page is transmitted from the controller 104 synchronously with a clock signal (not shown).

When it is detected that the PRNT signal is "TRUE", the engine 103 starts the printing operation and sets the TOP signal to "TRUE" for a predetermined period of time for the controller 104. When "TRUE" of the TOP signal is detected, the controller 104 transmits the VDO signal of one page synchronously with the "TRUE" TOP signal. The engine 103 forms an image in accordance with the VDO signal.

FIG. 4 shows a timing chart in the monochromatic mode. In the 1-page mode, the engine 103 issues the TOP signal once in response to the PRNT signal from the controller 104. In the 2-page mode, the engine 103 issues the TOP signal twice in response to the PRNT signal from the controller 104. When the print preparation of two pages is ready, the controller 104 sets the PRNT signal to "TRUE", transmits the image data of the first page synchronously with the first TOP signal from the engine 103, and transmits the image data of the second page synchronously with the next TOP signal.

FIG. 5 shows a timing chart in the full color mode. In the 1-page mode, the engine 103 issues the TOP signals of four colors of yellow, magenta, cyan, and black in response to the PRNT signal of the controller 104. In the 2-page mode, the engine 103 issues the TOP signal of total eight times of Y1 (the first page of yellow), Y2 (the second page of yellow), M1, M2, C1, C2, K1, and K2 in response to the PRNT signal from the controller 104.

When the print preparation of two pages is ready, the controller 104 sets the PRNT signal to "TRUE", transmits the yellow image data of the first page synchronously with the first TOP signal from the engine 103, transmits the yellow image data of the second page synchronously with the next TOP signal, and similarly transmits each image data of magenta of the first page, magenta of the second page, cyan of the first page, cyan of the second page, black of the first page, and black of the second page.

The change between the 1-page mode and the 2-page mode in the color laser beam printer 102 is performed by sending the serial communicating instruction from the controller 104 to the engine 103.

Figure 6:
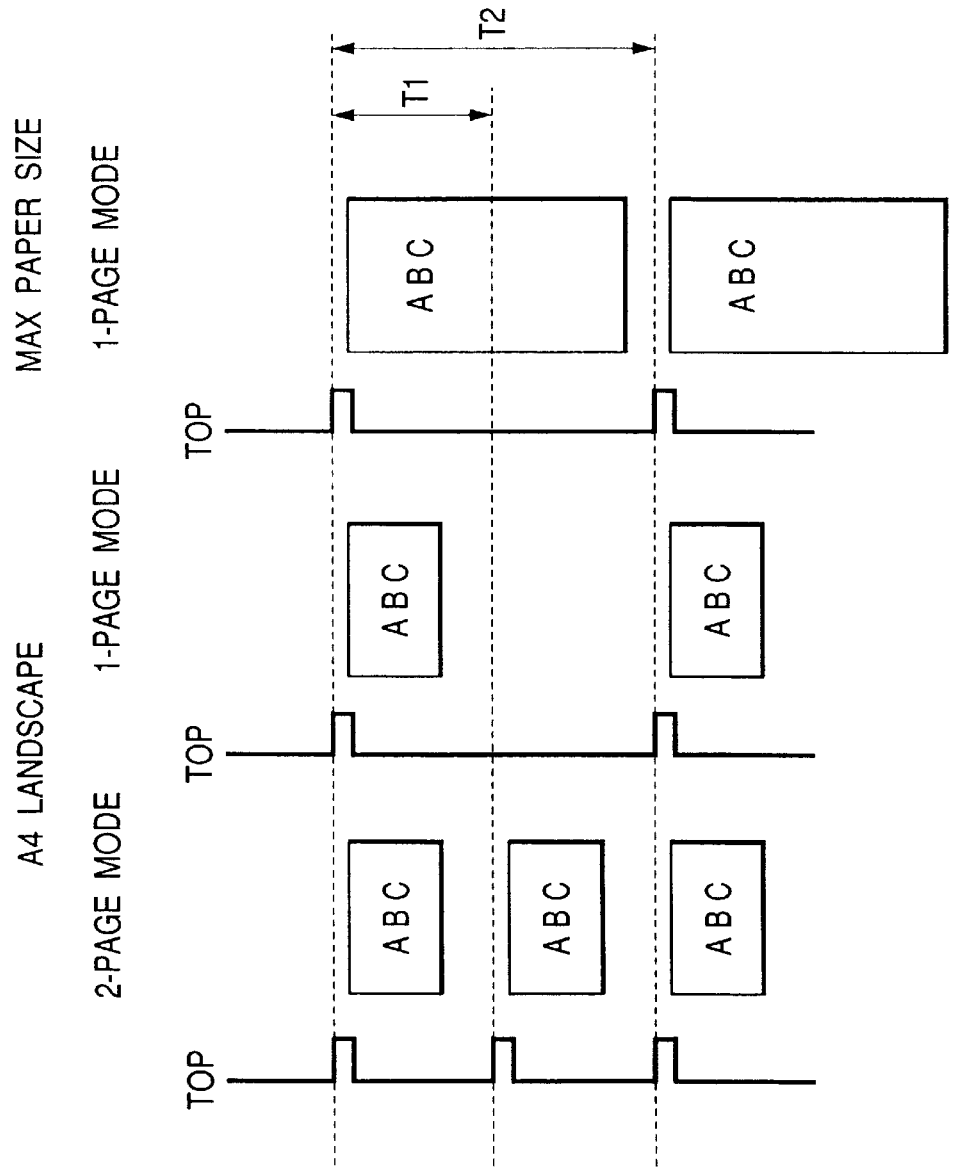
FIG. 6 is an explanatory diagram of a printing mode of the engine of the color laser beam printer according to the first and second embodiments of the invention.

FIG. 6 is a diagram showing that the 2-page mode in the color laser beam printer 102 according to the first embodiment of the invention is effective for the throughput. In the diagram, the component elements of the same denominations have already been described in FIGS. 4 and 5. T1 denotes an image forming interval in the 2-page mode and T2 indicates an image forming interval in the 1-page mode. In the 1-page mode, an issuing timing of the TOP signal is also set to the same interval as T2 even at the maximum paper size in the A4 landscape feed. Therefore, if the maximum throughput is expressed by the number of print copies per minute, they are equal even at both the maximum size and the minimum size. If the 2-page mode is used, the TOP issuing timing is equal to T1 and the number of print copies per minute is doubled as shown in the diagram.

In a manner similar to the well-known engine, when "TRUE" of the PRNT signal is not detected within a predetermined time from the TOP signal of the previous page, the engine 103 in the embodiment reduces temperature rising voltages of the laser scanner unit and fixing unit and enters an idling state. Since the print of the first page from the idling state cannot be started until the rotation of a scanner motor (not shown) for the laser scan is stabilized and the temperature rising of the fixing unit is completed, the controller 104 sets the PRNT signal to "TRUE" within a predetermined time as possible, thereby controlling so as to maintain the throughput.

Figure 7:
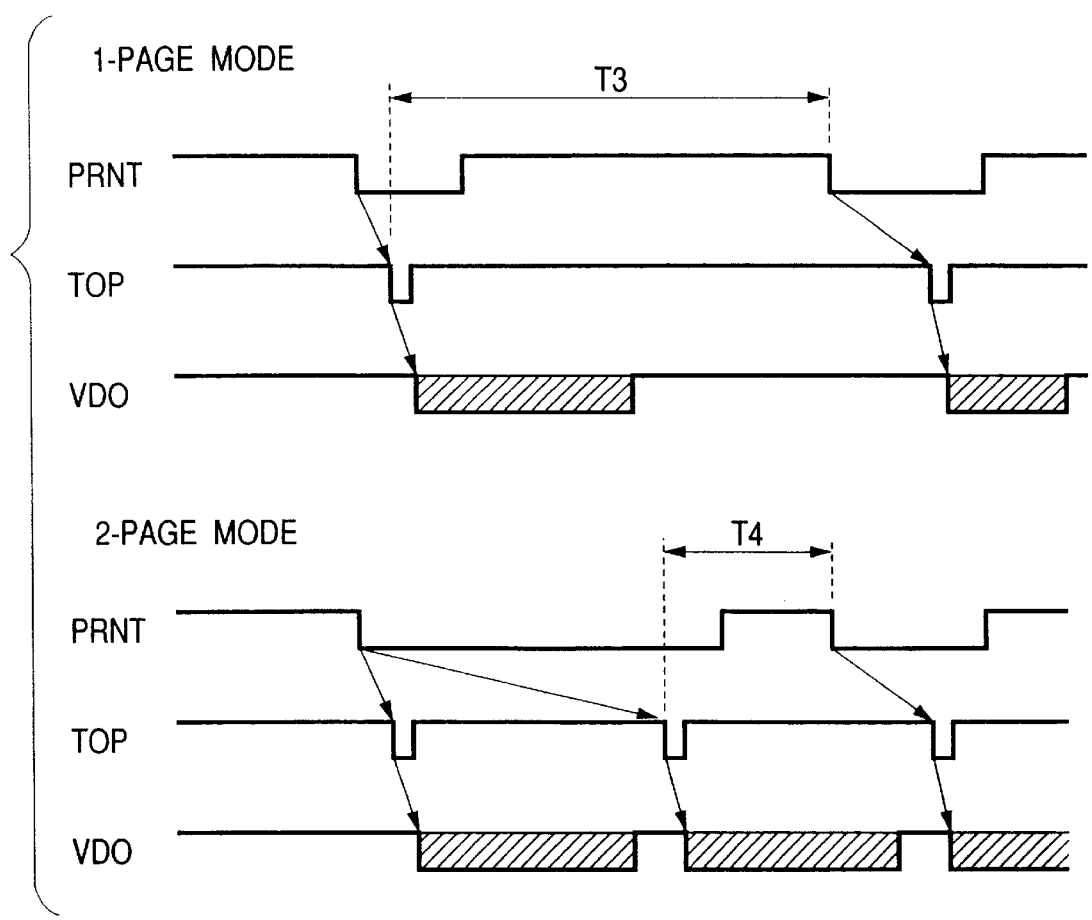
FIG. 7 is an explanatory diagram of the interface of the engine and the controller of the color laser beam printer according to the first and second embodiments of the invention.

FIG. 7 is a diagram showing a timing chart in the continuous print in the 2-page mode and 1-page mode in the color laser beam printer 102 according to the first embodiment of the invention. In the diagram, the component elements of the same denominations have already been described in FIGS. 4 and 5. T3 denotes a time within a range from the detection of "TRUE" of the TOP signal of the previous page in the 1-page mode to the detection of "TRUE" of the PRNT signal which can maintain the throughput. T4 denotes a time within a range from the detection of "TRUE" of the TOP signal of the previous page in the 2-page mode to the detection of "TRUE" of the PRNT signal which can maintain the throughput. As shown in the diagram, according to the 2-page mode, since the issuing timing of the TOP signal is shorter than that in the 1-page mode, the time T4 is shorter than the time T3.

T3>T4

In the embodiment, in the controller 104, the number of pages which can start the print in the printer is dynamically monitored and when the images of two pages are obtained, the engine 103 is shifted to the 2-page mode. If the number of holding pages is equal to only one, the maintaining time of the throughput is managed in accordance with whether the previous page is in the 1-page mode or the 2-page mode and whether the printer waits until the image data of two pages is accumulated or the print is started in the 1-page mode is discriminated.

Figure 1:
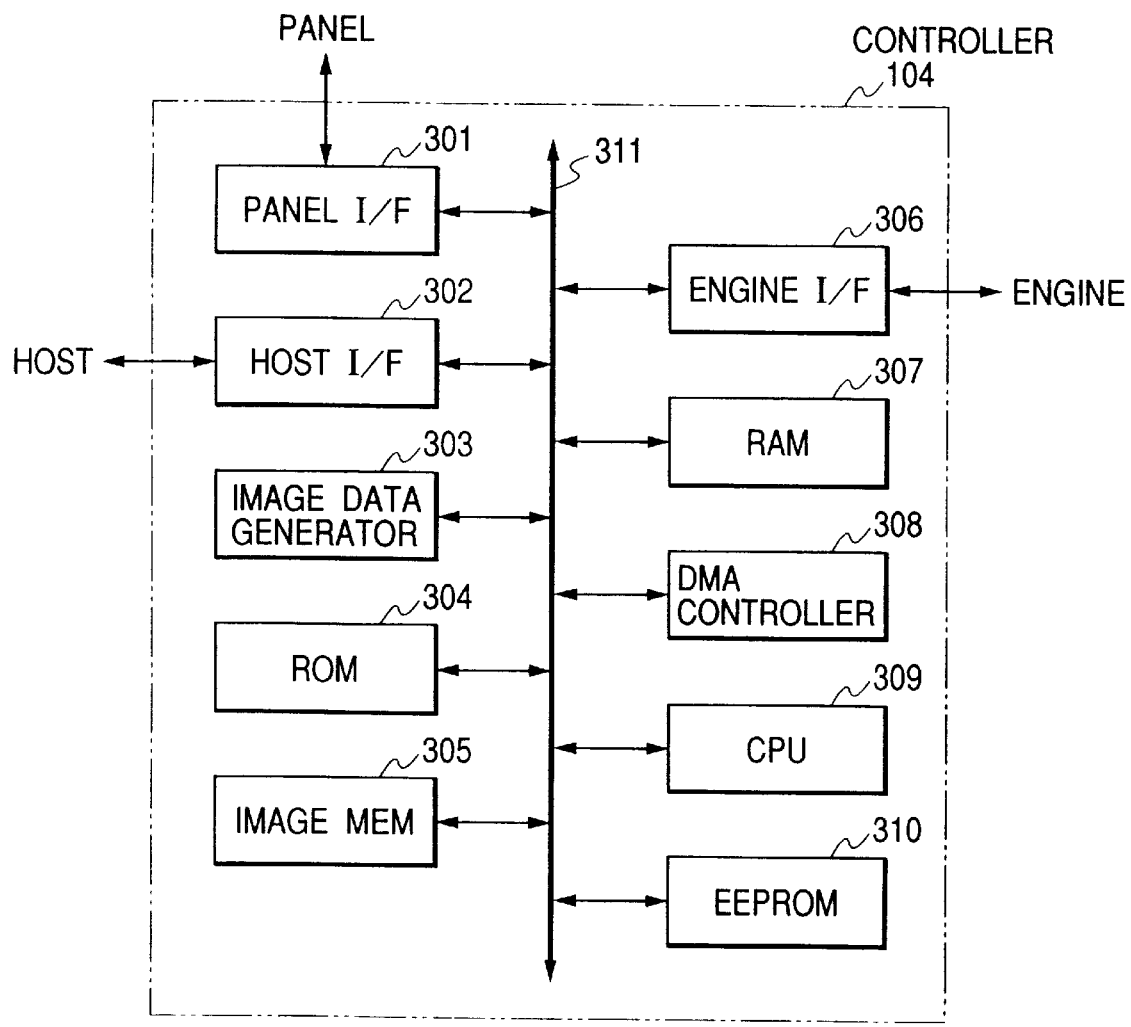
FIG. 1 is a block diagram showing an electrical construction of a controller of a color laser beam printer according to the first and second embodiments of the invention.

FIG. 1 is a block diagram showing an electric construction of the controller 104 of the color laser beam printer 102 according to the first embodiment of the invention. The controller 104 of the color laser beam printer 102 according to the first embodiment of the invention comprises: a panel interface (I/F) 301; a host I/F 302; an image data generator 303; an ROM 304; an image memory 305; an engine I/F 306; an RAM 307; a DMA (Direct Memory Access) controller 308; a CPU 309; an EEPROM (Electrically Erasable Programmable ROM) 310; and a system bus 311.

Functions of the above respective units will now be described in detail. The panel I/F 301 receives various settings and instructions from the operator via the panel 105 in FIG. 2 by a data communication with the panel 105. The host I/F 302 is an input/output unit of signals to/from the host 101 in FIG. 2. The engine interface 306 is an input/output unit of signals to/from the engine 103 in FIG. 2, transmits a data signal from an output buffer register (not shown), and performs a communication control with the engine 103.

The image data generator 303 generates bit map data for actual printing on the basis of the control code data that is sent from the host 101. The image memory 305 stores the image data. The CPU 309 controls the whole controller 104 and executes processes shown in flowcharts (the first embodiment) of FIGS. 10, 11, and 12, flowcharts (the second embodiment) of FIGS. 13 and 14, and flowcharts (the third embodiment) of FIGS. 18 to 21, which will be explained hereinlater. The ROM 304 stores control codes of the CPU 309. The RAM 307 is a memory for temporary storage which is used by the CPU 309. The DMA controller 308 transfers the bit map data in the image memory 305 to the engine I/F 306 by an instruction from the CPU 309. The EEPROM 310 is an electrically erasable memory and stores predetermined data.

The system bus 311 has an address bus and a data bus. The panel I/F 301, host I/F 302, image data generator 303, ROM 304, image memory 305, engine I/F 306, RAM 307, DMA controller 308, CPU 309, and EEPROM 310 are connected to the system bus 311 and can access to all of functional units on the system bus 311, respectively. It is assumed that the control codes to control the CPU 309 are constructed by: an OS (Operating System) to be time-divisionally controlled by a system clock (not shown) on a unit basis of a load module called a task; and a plurality of load modules (tasks) which operate on a function unit basis.

There is the following correspondence relationship between each unit in the color laser beam printer 102 according to the first embodiment of the invention and the second and third embodiments, which will be explained hereinlater, and each component requirement in Claims. The color laser beam printer 102 corresponds to a printing apparatus in Claims. The host 101 corresponds to an external apparatus in Claims. The CPU 309 in the controller 104 corresponds to control means and converting means in Claims. The host I/F 302 in the controller 104 corresponds to receiving means in Claims. The image memory 305 in the controller 104 corresponds to accumulating means in Claims. The engine 103 corresponds to image forming means in Claims. The intermediate transfer drum 205 corresponds to charging medium in Claims. The cassette paper feed clutch 203 and paper feed roller 204 correspond to transporting means in Claims.

Figure 8:
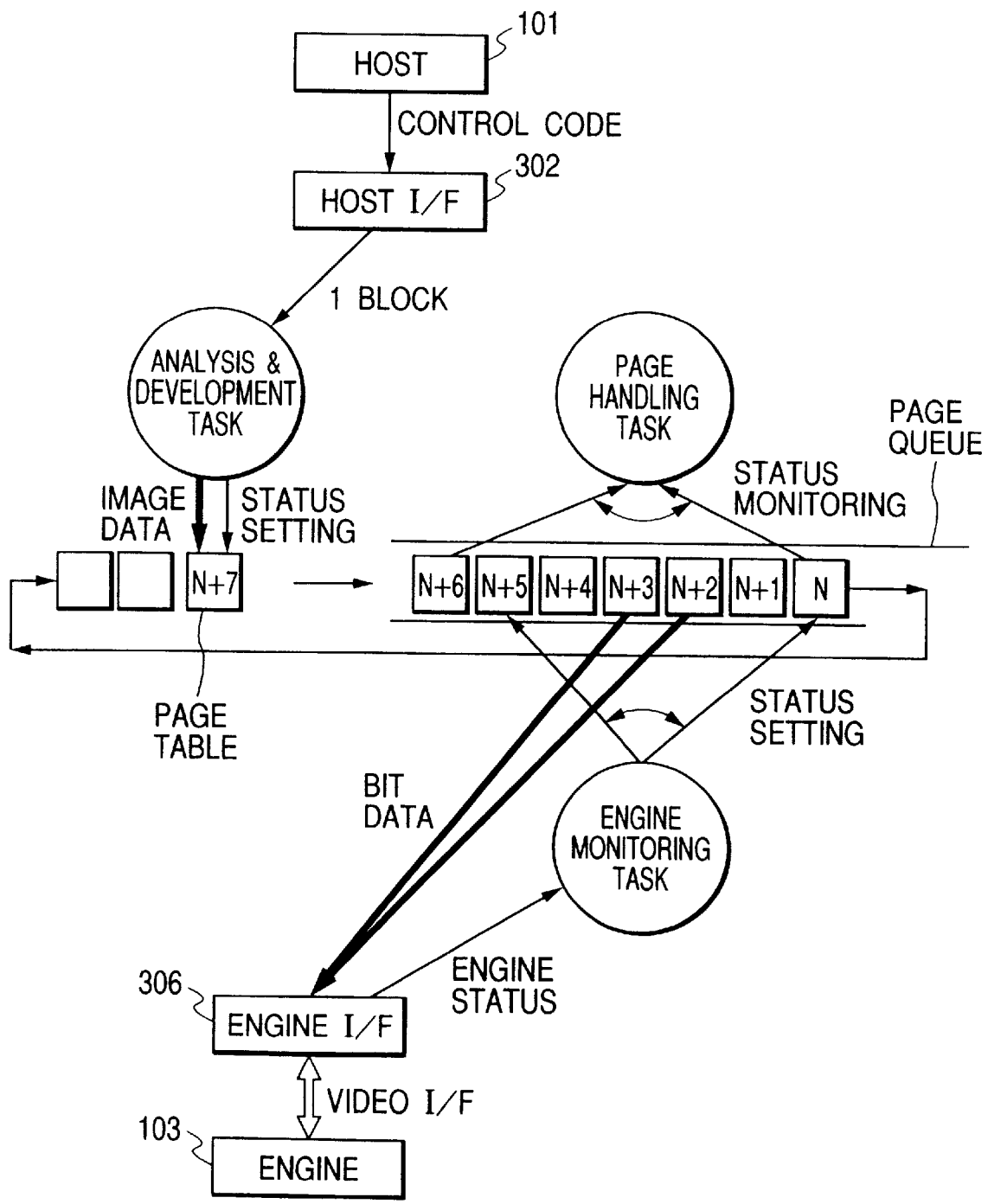
FIG. 8 is an explanatory diagram of a data flow and a control flow according to the first embodiment of the invention.

FIG. 8 is a diagram showing a data flow in the color laser beam printer 102 according to the first embodiment of the invention. It is assumed that an analysis & development task, a page handling task, and an engine monitoring task in the diagram are tasks in which the CPU 309 in the controller 104 is used as a substance as mentioned above and can logically operate in parallel.

Figure 9:
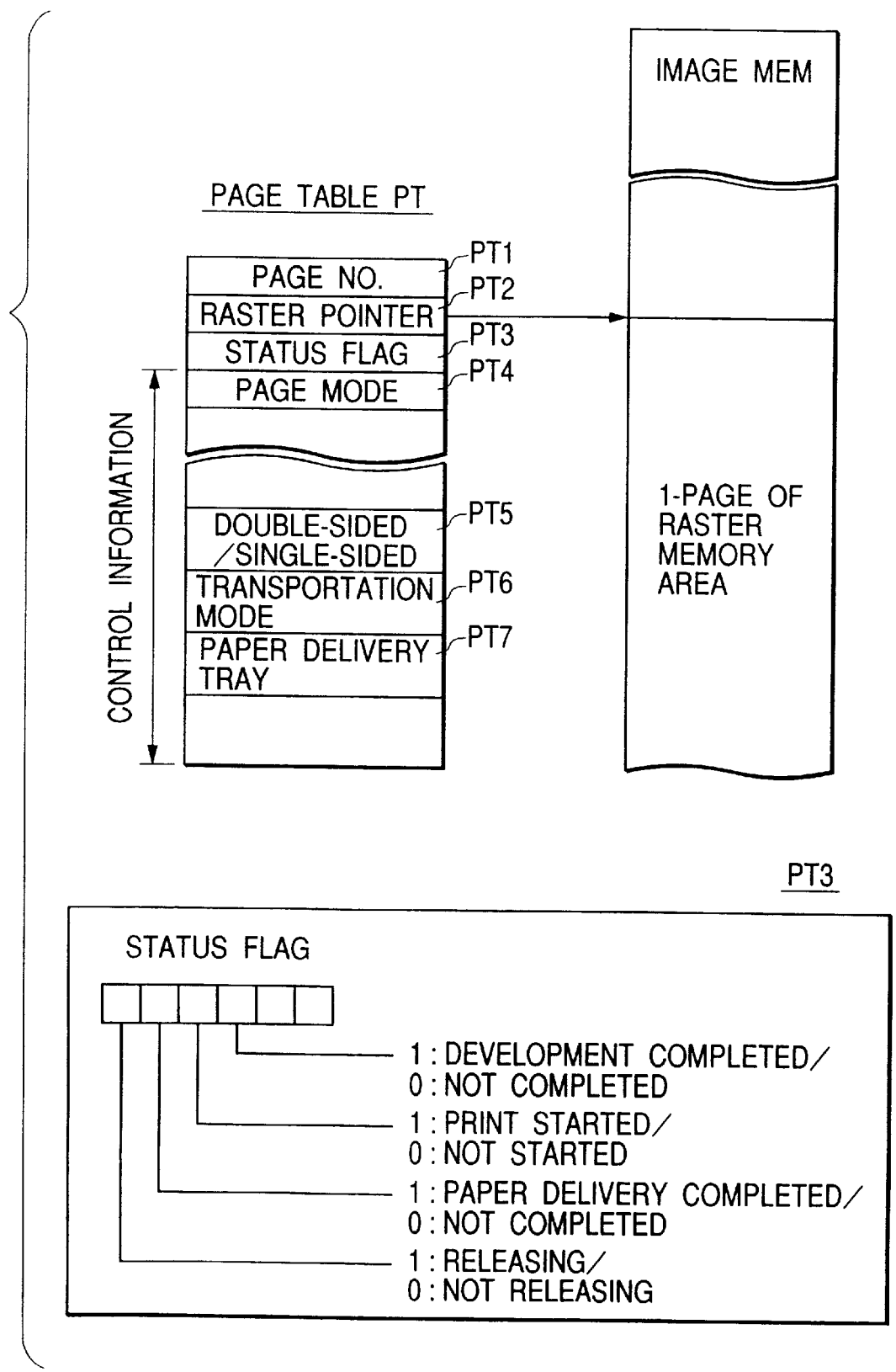
FIG. 9 is an explanatory diagram showing a logical map construction of a nonvolatile memory according to the first and second embodiments of the invention.

FIG. 9 is a diagram showing a structure of a page table PT in FIG. 8 according to the first embodiment of the invention.

In the diagram, the page table PT is a table to logically recognize each page in the CPU 309 in the controller 104 and substantially exists as a continuous area in a control information storage area (not shown) in the RAM 307 and its getting and release are managed by a page management functional unit (not shown). A "raster pointer" PT2 in the diagram is a head pointer of an area of one page in the image memory 305. The CPU 309 divides a relevant area (not shown) in the image memory 305 every page and links thereto at the time of the initialization of a power-on.

PT3 denotes a "status flag" and is an area to store a flag indicative of a status of a page. As shown in FIG. 9, there are the following flags.

"Release flag"
"Development completed flag"
"Print start flag"
"Paper delivery completed flag"

There are the following page forming modes.

"1-page mode"
"the first page in the 2-page mode"
"the second page in the 2-page mode"

The data flow of FIG. 8 will now be described hereinbelow. The print data (control codes, PDL (Page Description Language), etc.) which is inputted from the host 101 to the color laser beam printer 102 is stored into the host I/F 302 on a predetermined block unit basis. When data is detected in the host I/F 302, the analysis & development task obtains the page table. The data is analyzed on such a block unit basis and as for image formation information (diagram drawing command of PDL, character codes, etc.), intermediate data is formed by using the image data generator 303 (not shown in FIG. 8) or by the CPU 309 itself and stored as intermediate data into an area shown by "raster pointer PT2" in the page table PT.

The intermediate data is compression data of an image object unit and has a well-known data structure such that an image of one page is decompressed every predetermined band and raster data can be formed.

According to the analysis task, when the intermediate data is formed, prediction time information regarding the formation of the raster data from the intermediate data included in each band is accumulated every intermediate data, the prediction time information of each band is obtained and stored into a band information area existing in a header area of the intermediate data, whether the prediction time information is in time corresponding to a transfer rate of the VDO signal or not is discriminated, and a result is stored.

Further, control information (copy quantity, selection of paper to be fed, etc.) relative to the printer is stored into a page table. After the data of one page was completely analyzed and developed, the "development completed" flag is set to "TRUE" and the data is enqueued into a page queue of an FIFO (First-In First-Out) structure.

The page handling task simultaneously monitors the "status" flags of all pages in the page queue, changes the transporting procedure in accordance with the statuses, and realizes the print.

Explanation will be made in detail in the third embodiment. Specifically speaking, in case of the 1-page mode, before printing, a memory area for raster development is allocated to two head bands and the bands in which the discrimination result of the prediction time is "NG". After completion of the development (rasterizing process) of all of the allocated bands (the allocation and the band development are together called a preceding development (prerendering)), the PRNT signal is set to "TRUE", thereby subsequently allowing the band development and the VDO transfer to be operated in parallel by a transmission task (not shown).

In case of the 2-page mode, before printing, a memory area for task development is allocated to two head bands of the first page and the bands in which the discrimination result of the prediction time is "NG". After completion of the development of all of the allocated bands, the PRNT signal is set to "TRUE", thereby subsequently allowing the band development and the VDO transfer to be operated in parallel by the transmission task (not shown).

The page table PT in which the "paper delivery completed" flag is "TRUE" is dequeued from the page queue and returned to the page management functional unit. The engine monitoring task performs a communication with the engine 103 at a predetermined period through the engine I/F 306 and updates the "status" flag when a factor which changes the status of the page occurs.

Figure 10:
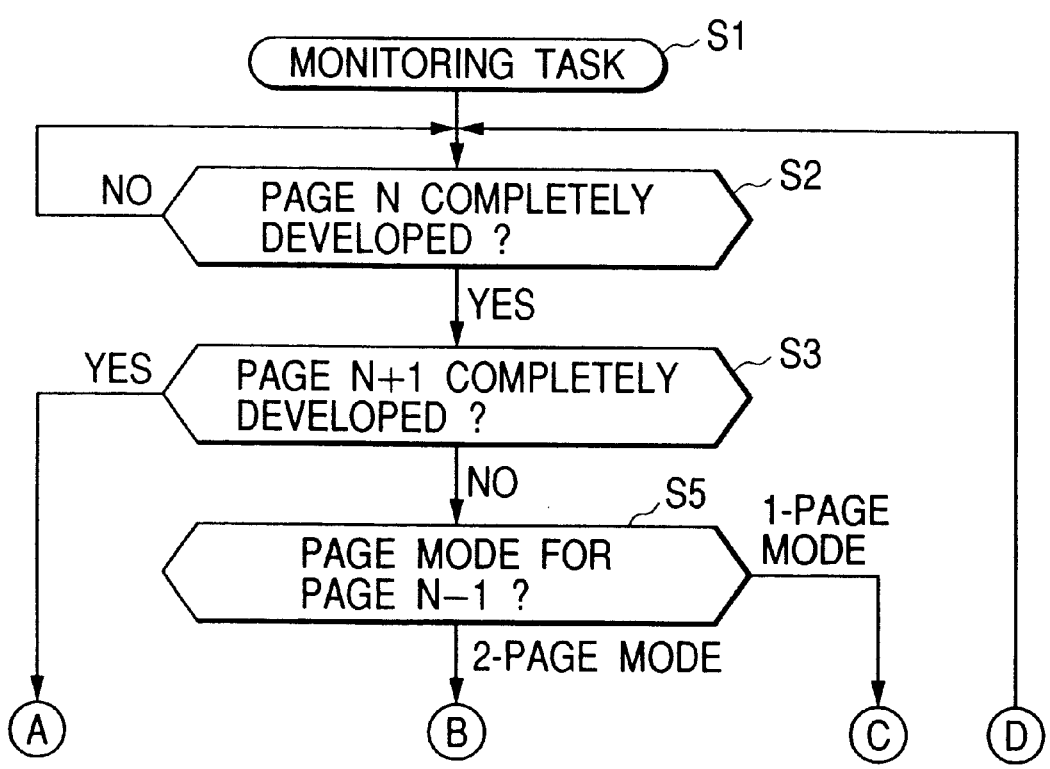
FIG. 10 is a flowchart showing the operation of a CPU of the controller of the color laser beam printer according to the first embodiment of the invention.
Figure 11:
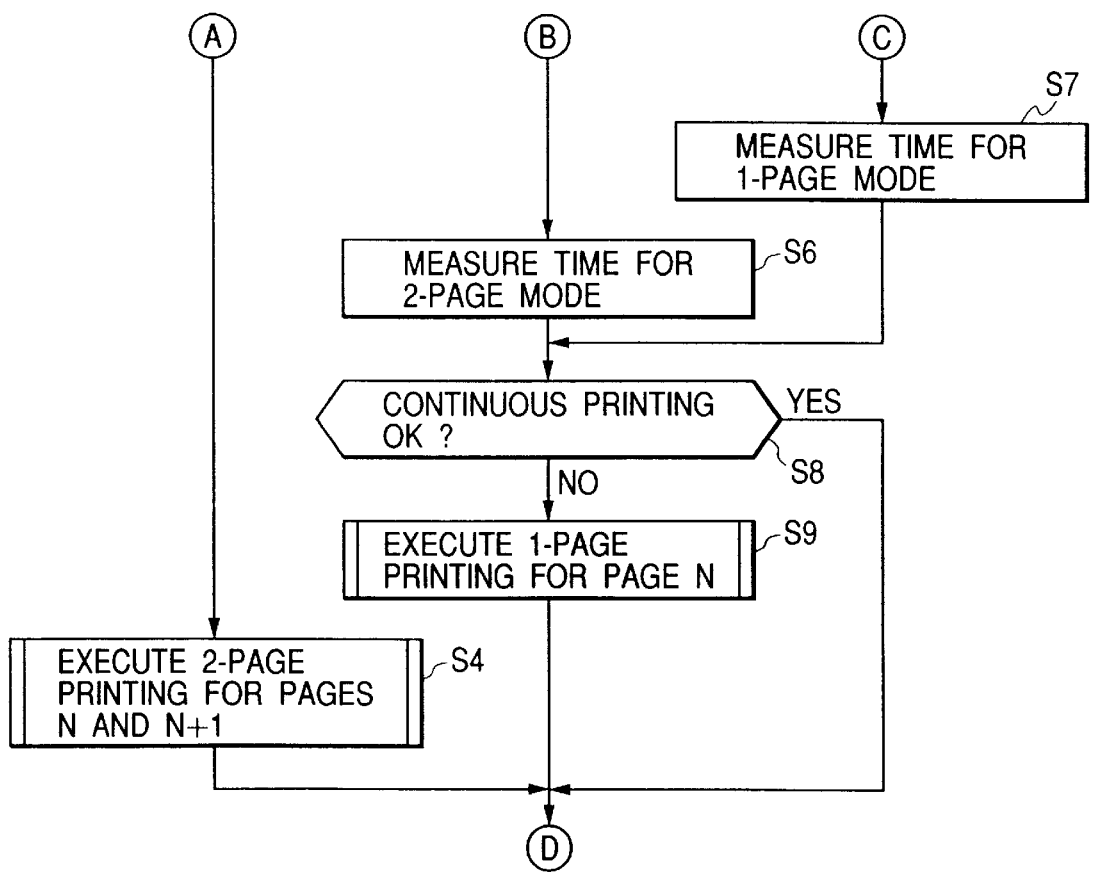
FIG. 11 is a flowchart showing the operation of the CPU of the controller of the color laser beam printer according to the first embodiment of the invention.

FIGS. 10 and 11 are flowcharts showing an example of the first data processing procedure in the color laser beam printer 102 according to the first embodiment of the invention constructed as mentioned above and correspond to the detailed procedure of the page handling task shown in FIG. 8.

The page handling task monitors the page queue at a predetermined period when it is activated at the time of power-on (step S1). When the page handling task detects that the page N in a state of ("development completed" flag=ON) and ("print start" flag=OFF) exists in the page queue (step S2), the presence or absence of the page (N+1) as a next page and the "development completed" flag are discriminated (step S3). If the page (N+1) exists (YES in step S3), the page handling task executes a printing routine in the 2-page mode of the pages N and (N+1) (step S4).

When the development of the page (N+1) is not completed yet (NO in step S3), if the engine 103 is at present executing the printing, the printing mode of such a page, namely, the previous page (N−1) is discriminated (step S5). In the 1-page mode, the page handling task calculates time T5 obtained by adding T3 in FIG. 7 to the final print start time (TOP signal issuing time) allocated to a predetermined address in the temporary storage RAM 307 of the controller 104 (step S7). In the 2-page mode, the page handling task calculates time T5 obtained by adding T4 in FIG. 7 (step S6). The page handling task compares the current time with T5. When it is determined that there is not enough time for a print start instruction (NO in step S8), the page N is printed in the 1-page mode. If there is an enough time for the print start instruction (YES in step S8), the processing routine is returned to step S2.

Figure 12:
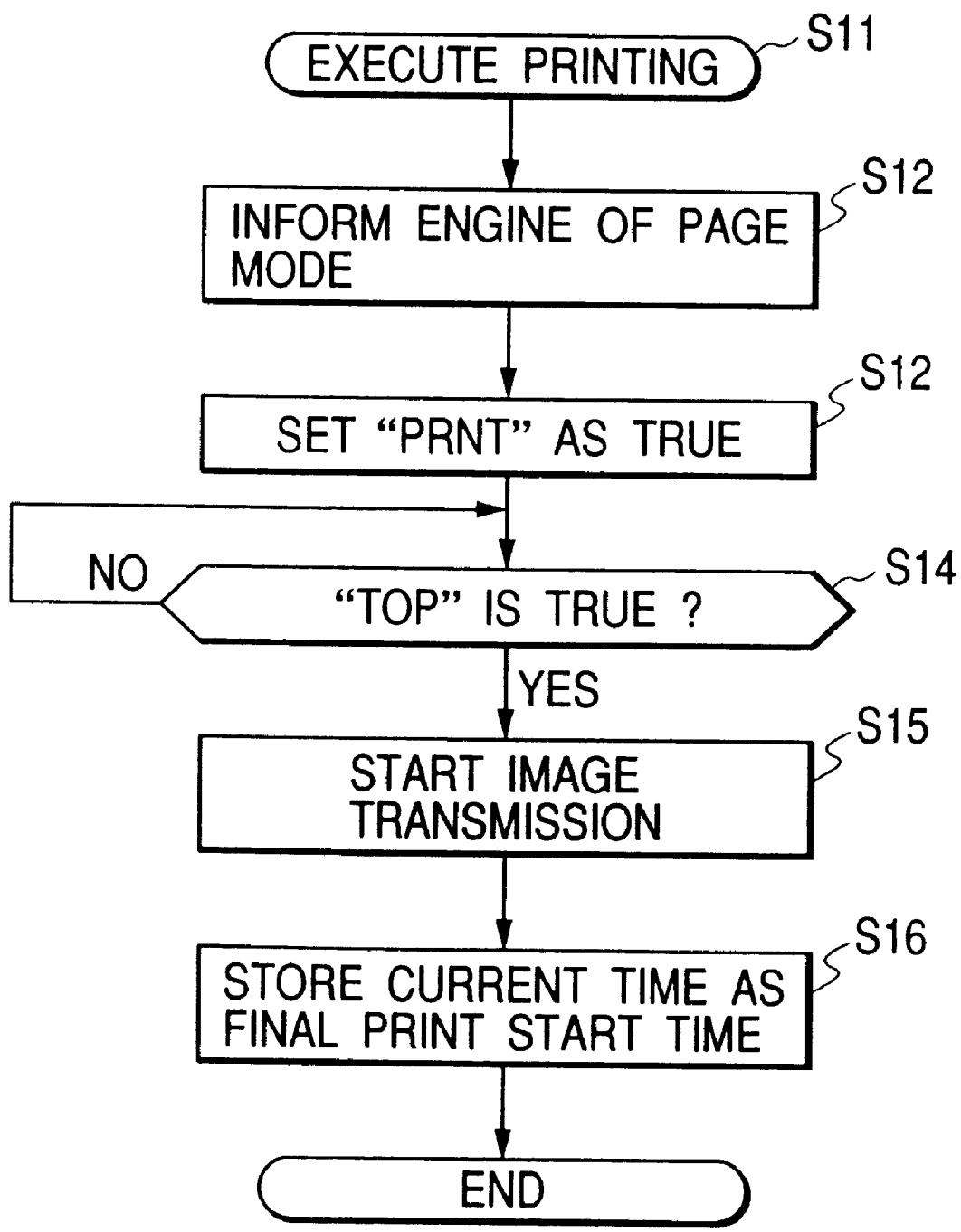
FIG. 12 is a flowchart showing the operation of the CPU of the controller of the color laser beam printer according to the first embodiment of the invention.

A print executing routine in the color laser beam printer 102 according to the first embodiment of the invention will now be described with reference to a flowchart of FIG. 12. FIG. 12 is a control flowchart for the print executing routine.

In the print executing routine, when the print execution is started (step S11), the page forming mode determined by the page handling task is notified to the engine 103 (step S12) and the PRTN signal is set to "TRUE" (step S13). This routine is waited until the TOP signal is set to "TRUE" (step S14). When "TRUE" of the TOP signal is detected, the print executing routine activates the DMA controller 308 of the controller 104 and the engine I/F 306, thereby allowing the image transfer to be started (step S15). Further, the time at this point is stored as a final print start time (step S16) and the processing routine is finished.

By constructing and controlling the color laser beam printer 102 as mentioned above, the maximum throughput of the color laser beam printer 102 (printing apparatus) of the electrophotographing system to form toner images of a plurality of pages can be derived before the toner image is transferred onto the paper.

As described above, the color laser beam printer according to the first embodiment of the invention comprises: the host I/F 302 of the controller 104 for receiving the print data from the host 101; image memory 305 of the controller 104 in which the image data as much as a plurality of pages can be stored; engine 103 which can overlay the toner image formed every color onto the intermediate transfer member 205, hold them thereon, transfer them onto the paper in a lump, form a full color image, and form a monochromatic image; and CPU 309 of the controller 104 for analyzing the print data, converting it into the image data of a page unit, converting the image data into data of every plural color components, switching the 1-page mode or 2-page mode in accordance with the number of pages of the image data, a discrimination result about whether the print forming mode at the switching timing is the 1-page mode or the 2-page mode, a time condition until the print start to hold the printing state, and an accumulation state of the image data, and allowing the engine 103 to execute the image formation. Therefore, the following operation and effects are obtained.

In the above construction, the CPU 309 of the controller 104 dynamically monitors the number of pages whose printing can be started. When the image data of two pages is obtained, the CPU 309 shifts the engine 103 into the 2-page mode. If the number of remaining pages is equal to only one, the CPU 309 manages the throughput maintaining time in accordance with a discrimination result about whether the previous page is in the 1-page mode or the 2-page mode and discriminates whether the CPU waits until the image data of two pages is accumulated or the printing is started in the 1-page mode.

That is, by providing the 2-page mode to form the toner images of a plurality of pages onto the intermediate transfer member when the paper length is equal to or shorter than ½ of the maximum paper size, the maximum number of print copies per minute is increased. Further, whether the print forming mode is the 2-page mode to form the toner images of a plurality of pages or the 1-page mode to form the toner image of one page is determined in accordance with the number of analysis completed pages of the print data and a discrimination result about which one of the 1-page mode and the 2-page mode the printing mode of the previous page is. Moreover, whether the 2-page mode can be performed or not is discriminated with respect to the pages having serial page numbers.

In the first embodiment of the invention, therefore, the maximum print throughput of the intermediate transfer system can be derived and there are a color deviation preventing effect and an effect such that a color laser beam printer which satisfies both the printing quality and the printing speed can be provided.

Second Embodiment

In a manner similar to the first embodiment, a system including a color laser beam printer according to the second embodiment of the invention is mainly constructed by the host 101 and color laser beam printer 102. Further, the color laser beam printer 102 comprises the engine 103, controller 104, and panel 105 (refer to FIG. 2).

In a manner similar to the first embodiment, the engine 103 of the color laser beam printer 102 according to the second embodiment of the invention comprises: the paper cassette 202; cassette paper feed clutch 203; paper feed roller 204; intermediate transfer drum 205; drum cartridge 208; photosensitive drum 209; black toner developing unit 210; yellow toner developing unit 211; magenta toner developing unit 212; cyan toner developing unit 213; YMC developing unit supporting unit 214; fixing heater 215; scanner unit 216; secondary transfer roller 231; fixing rollers 217 and 232; conveying rollers 218 and 219; paper deliver tray 220; manual paper feed clutch 221; paper feed base 222; and reverse paper re-feed unit 234 having the conveying rollers 223, 224, and 233 (refer to FIG. 3).

In a manner similar to the first embodiment, the controller 103 of the color laser beam printer 102 according to the second embodiment of the invention comprises: the panel I/F 301; host I/F 302; image data generator 303; ROM 304; image memory 305; engine I/F 306; RAM 307; DMA controller 308; CPU 309; EEPROM 310; and system bus 311 (refer to FIG. 1). The description of the construction in each unit in FIGS. 2, 3, and 1 is omitted because they have been described in detail in the first embodiment mentioned above.

Since the first embodiment relates to the single-sided print as an example, the 2-page mode is discriminated in the continuous pages (N and N+1). However, as well as the case of performing the double-sided printing by using the reverse paper re-feed unit 234 in FIG. 3, the discrimination about the permission or inhibition of the 2-page mode is not limited to the continuous pages as targets.

Figure 13:
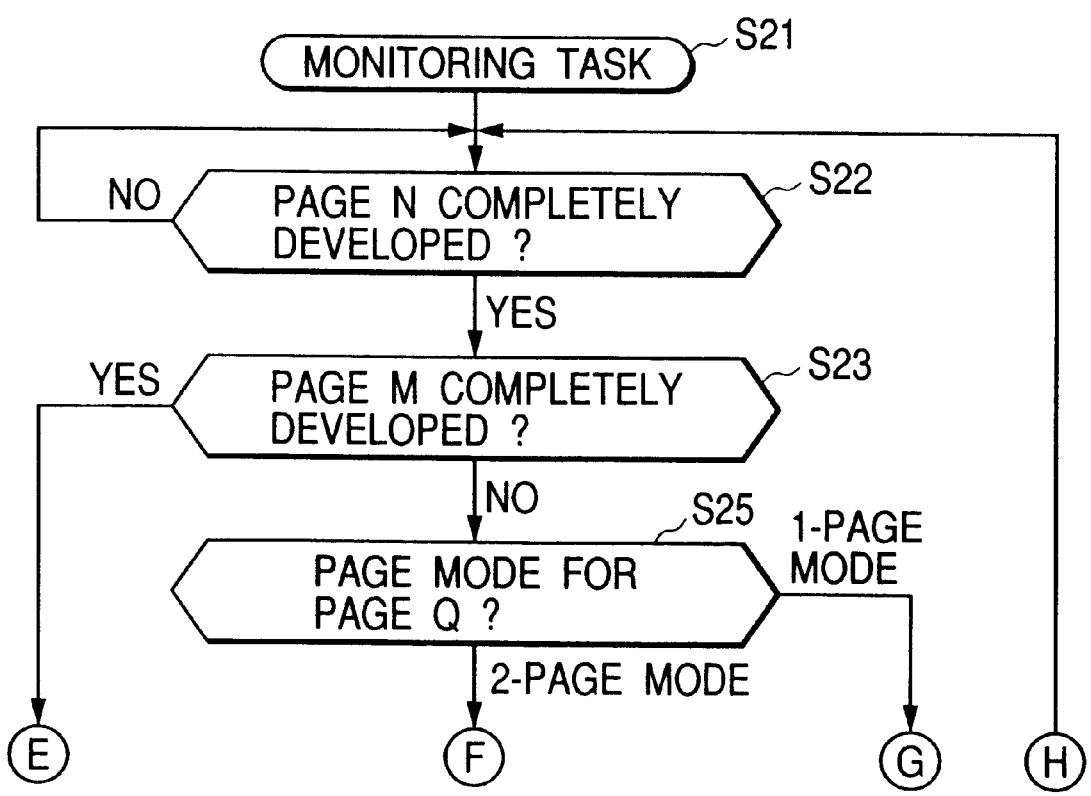
FIG. 13 is a flowchart showing the operation of a CPU of the controller of the color laser beam printer according to the second embodiment of the invention.
Figure 14:
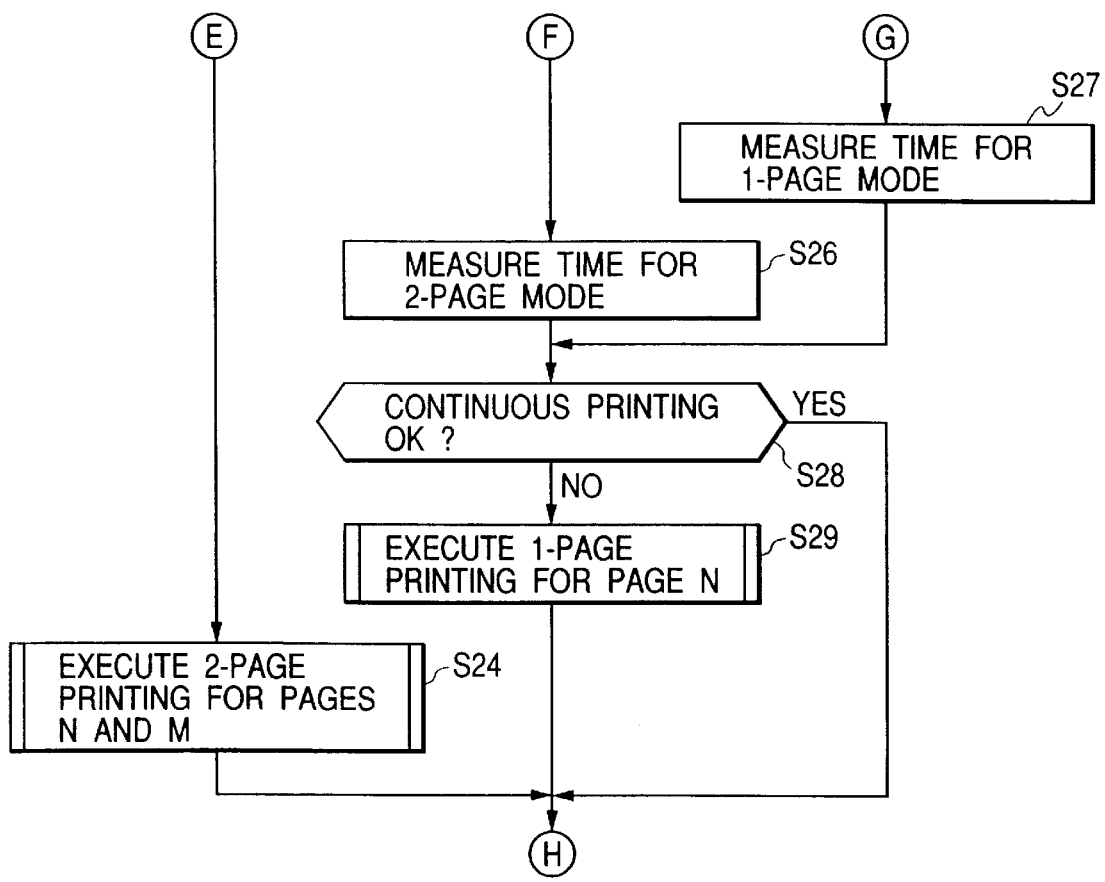
FIG. 14 is a flowchart showing the operation of the CPU of the controller of the color laser beam printer according to the second embodiment of the invention.

FIGS. 13 and 14 are flowcharts showing an example of the second data processing procedure in the color laser beam printer 102 according to the second embodiment of the invention constructed as mentioned above and correspond to the detailed procedure of the page handling task shown in FIG. 8.

First, in case of sequentially printing in order of page Q, page N, and page M irrespective of the page forming mode, the page handling task monitors the page queue at a predetermined interval when it is activated at the time of power-on (step S21). When the page handling task detects that the page N in a state of ("development completed" flag=ON) and ("print start" flag=OFF) exists in the page queue (step S22), the presence or absence of the page M and the "development completed" flag are discriminated (step S23). If the page M exists (YES in step S23), the page handling task executes a printing routine in the 2-page mode of the pages N and M (step S24).

When the development of the page M is not completed yet (NO in step S23), if the engine 103 is at present executing the printing, the printing mode of the page Q is discriminated (step S25). In the 1-page mode, the page handling task calculates the time T5 obtained by adding T3 in FIG. 7 to the final print start time (TOP signal issuing time) allocated to a predetermined address in the temporary storage RAM 307 of the controller 104 (step S27). In the 2-page mode, the page handling task calculates time T5 obtained by adding T4 in FIG. 7 (step S26). The page handling task compares the current time with T5. When it is determined that there is no time for a print start instruction (NO in step S28), the page N is printed in the 1-page mode. If there is a time for the print start instruction (YES in step S28), the processing routine is returned to step S22.

As described above, the color laser beam printer according to the second embodiment of the invention comprises: the host I/F 302 of the controller 104 for receiving the print data from the host 101; image memory 305 of the controller 104 in which the image data as much as a plurality of pages can be stored; engine 103 which can overlay the toner image formed every color onto the intermediate transfer member 205, hold them thereon, transfer them onto the paper in a lump, form a full color image, and form a monochromatic image; and CPU 309 of the controller 104 for analyzing the print data, converting it into the image data of a page unit, converting the image data into data of every plural color components, switching the 1-page mode or 2-page mode in accordance with the number of pages of the image data, a discrimination result about whether the print forming mode at the switching timing is the 1-page mode or the 2-page mode, a time condition until the print start to hold the printing state, and an accumulation state of the image data, and allowing the engine 103 to execute the image formation. Therefore, the following operation and effects are obtained.

In the above construction, the CPU 309 of the controller 104 dynamically monitors the number of pages whose printing can be started. When the image data of two pages is obtained, the CPU 309 shifts the engine 103 into the 2-page mode. If the number of remaining pages is equal to only one, the CPU 309 manages the throughput maintaining time in accordance with a discrimination result about whether the previous page is in the 1-page mode or the 2-page mode and discriminates whether the CPU waits until the image data of two pages is accumulated or the printing is started in the 1-page mode.

That is, by providing the 2-page mode to form the toner images of a plurality of pages onto the intermediate transfer member when the paper length is equal to or shorter than ½ of the maximum paper size, the maximum number of print copies per minute is increased. Further, whether the print forming mode is the 2-page mode to form the toner images of a plurality of pages or the 1-page mode to form the toner image of one page is determined in accordance with the number of analysis completed pages of the print data and a discrimination result about which one of the 1-page mode and the 2-page mode the printing mode of the previous page is. Moreover, whether the 2-page mode can be performed or not is discriminated with respect to the pages having non-serial page numbers.

In the second embodiment of the invention, therefore, in a manner similar to the first embodiment, the maximum print throughput of the intermediate transfer system can be derived and there are a color deviation preventing effect and an effect such that a color laser beam printer which satisfies both the printing quality and the printing speed can be provided.

Third Embodiment

In a manner similar to the first and second embodiments, a system including a color laser beam printer according to the third embodiment of the invention is mainly constructed by the host 101 and color laser beam printer 102. Further, the color laser beam printer 102 comprises the engine 103, controller 104, and panel 105 (refer to FIG. 2).

The third embodiment corresponds to the processes after it was determined to be the 2-page mode in the foregoing embodiments. In the embodiment, at the time of the continuous printing, the controller 104 further switches the timing to set the PRNT signal to "TRUE" to a timing before or after the previous development and dynamically switches the page forming mode in accordance with the total time that is required for the previous development, thereby deriving the maximum print throughput performance of the engine 103.

FIG. 15 is a diagram for explaining the raster data formation processing operation in the 2-page mode in the controller 104 shown in FIG. 2. An arrow indicates a conveying direction of the paper.

In the diagram, the pages N and M are pages of the A4 size which are conveyed in the landscape direction.

A band information area BI is shown as an example of a case of forming the pages N and M in the 2-page mode.

BI-1 denotes a band ID. A1 to A6 correspond to the band ID of the first page. B1 to B6 correspond to the band ID of the second page. BI-2 indicates a development time. BI-3 shows a memory assignment. The contents in the band information area BI are logically shown.

"OK" shown in the area of the development time BI-2 relates to a case where the development time is in time relative to the VDO transfer rate and "NG" relates to a case where it is not in time. "M1", "M2", "M3", "M4", and "M5" shown in the area of the memory assignment BI-3 denote head addresses in the memory area to store the raster data, respectively. The bands to which the same memory has been assigned are circulatively used after the VDO transfer.

Figure 16:
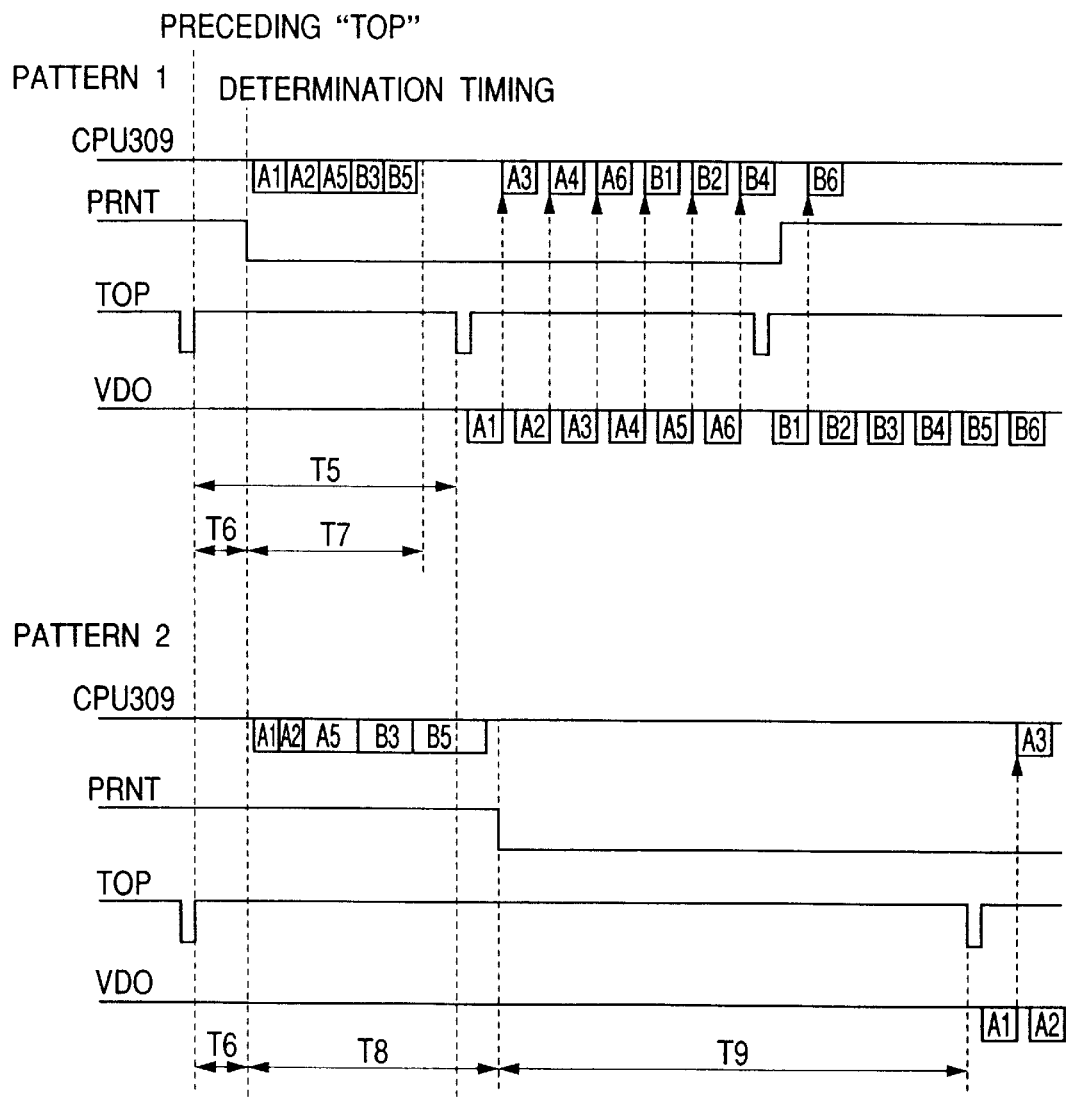
FIG. 16 is a timing chart for explaining the page development processing operation in a print control apparatus according to the embodiment.
Figure 17:
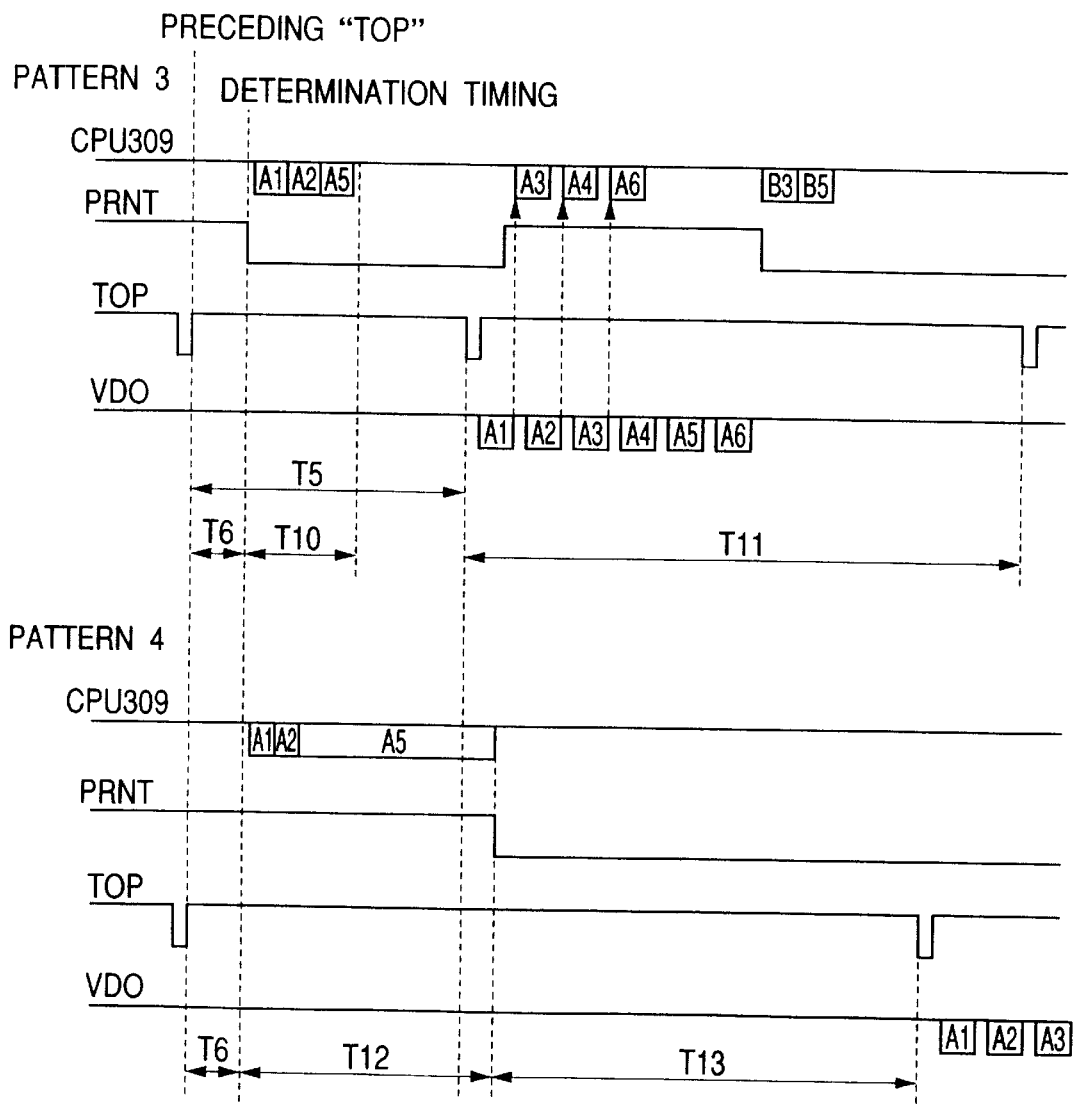
FIG. 17 is a timing chart for explaining the page development processing operation in the print control apparatus according to the embodiment.

FIGS. 16 and 17 are timing charts for explaining the page development processing operation in the print control apparatus according to the embodiment and correspond to the relations between the timing when the controller 104 generates the VDO data and the timing when the PRNT signal is set to "TRUE" in the continuous printing mode.

In the diagrams, PRNT, TOP, and VDO denote the same as those described in FIG. 4.

In the diagrams, a preceding "TOP" denotes a timing of "TRUE" of the TOP signal of the previous page and a "determination timing" indicates a timing when the controller 104 decides a control method.

T6 denotes a time which is required from "TRUE" of the TOP signal of the previous page to the "determination timing". T5 indicates the TOP interval when the processing speed of the engine 103 in the 2-page mode is maximum.

T7 and T8 denote total times which are required for the preceding development of the pages N and M in the 2-page mode. T9 indicates a time which is required until the TOP signal is again set to "TRUE" after the engine 103 received "TRUE" of the PRNT signal from a predetermined idling state in the 2-page mode.

A pattern 1 relates to a case where the 2-page mode is processed by the maximum throughput. Since the determination timing and the preceding development are finished for the time interval T5, the printing process is performed wastelessly.

A pattern 2 relates to a case where although the 2-page mode is performed, since the system temporarily enters the idling state, the throughput slightly deteriorates.

T10 and T12 denote total times which are required for the preceding development of the page N in the 1-page mode. T11 denotes a TOP interval when the processing speed of the engine 103 in the 1-page mode is maximum. T13 indicates a time which is required until the TOP signal is again set to "TRUE" after the engine 103 received "TRUE" of the PRNT signal from a predetermined idling state in the 1-page mode.

A pattern 3 relates to a case where since the determination timing and the preceding development are finished for the time interval T5 in the 1-page mode, the printing process is performed wastelessly.

A pattern 4 relates to a case where since the determination timing and the preceding development are not finished for the time interval T5 in the 1-page mode, the system temporarily enters the idling state, and the throughput deteriorates.

A1 to A6 on the CPU 309 line denote development of each band of the page N and B1 to B6 indicate development of each band of the page M. A1 to A6 on the VDO line denote raster transfer of the page N and B1 to B6 indicate raster transfer of each band of the page M.

Further, although not shown, a time T14 from a timing when the TOP signal of the previous page is set to "TRUE" to a timing when the PRNT signal is set to "TRUE" in order to keep the continuous printing state is defined. That is, when the previous page is in the 1-page mode, T3 (refer to FIG. 7) is set and when the previous page is in the 2-page mode, T4 (refer to FIG. 7) is set.

Figure 18:
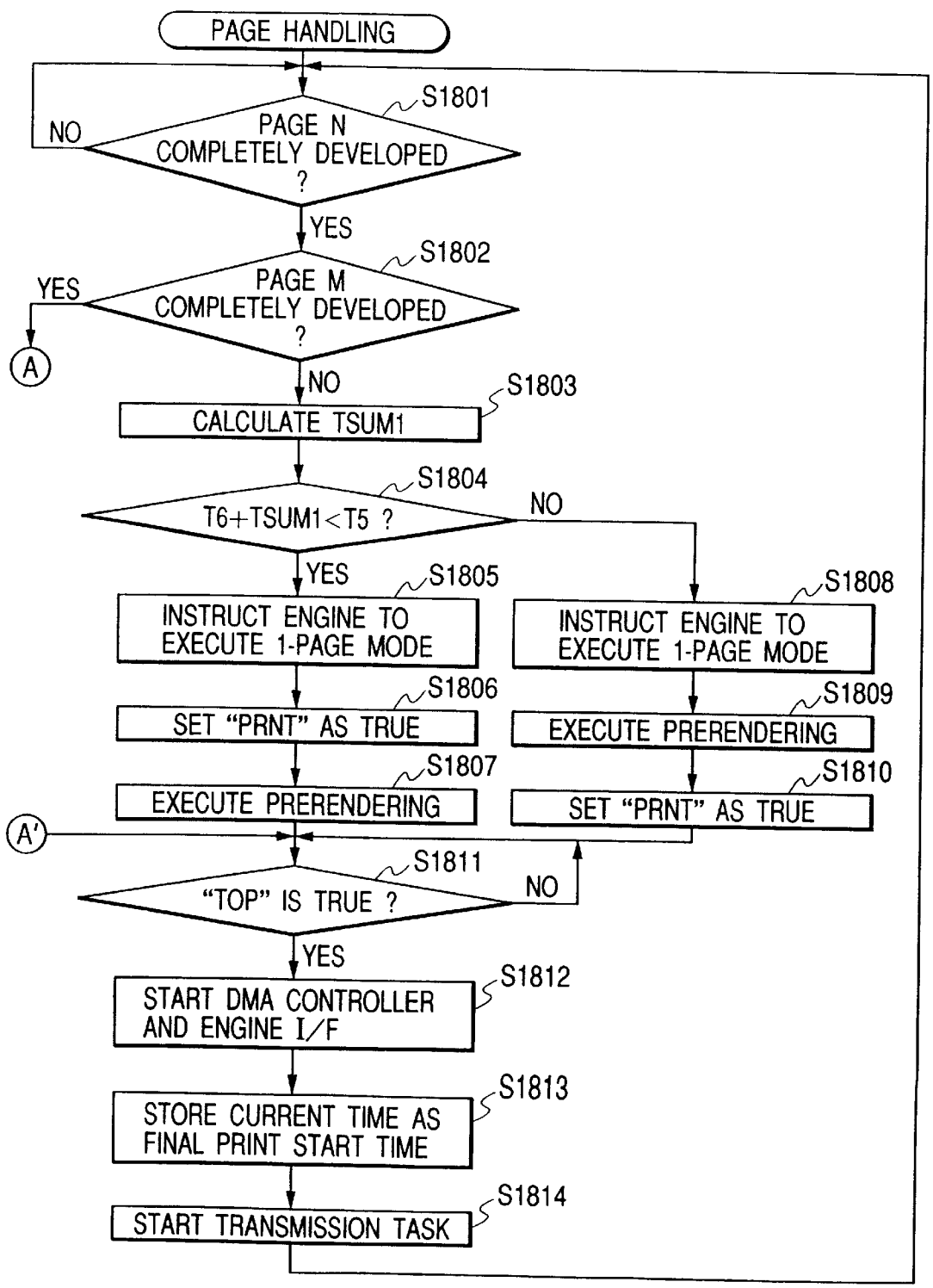
FIG. 18 is a flowchart showing an example of a third data processing procedure in the print control apparatus according to the embodiment.
Figure 19:
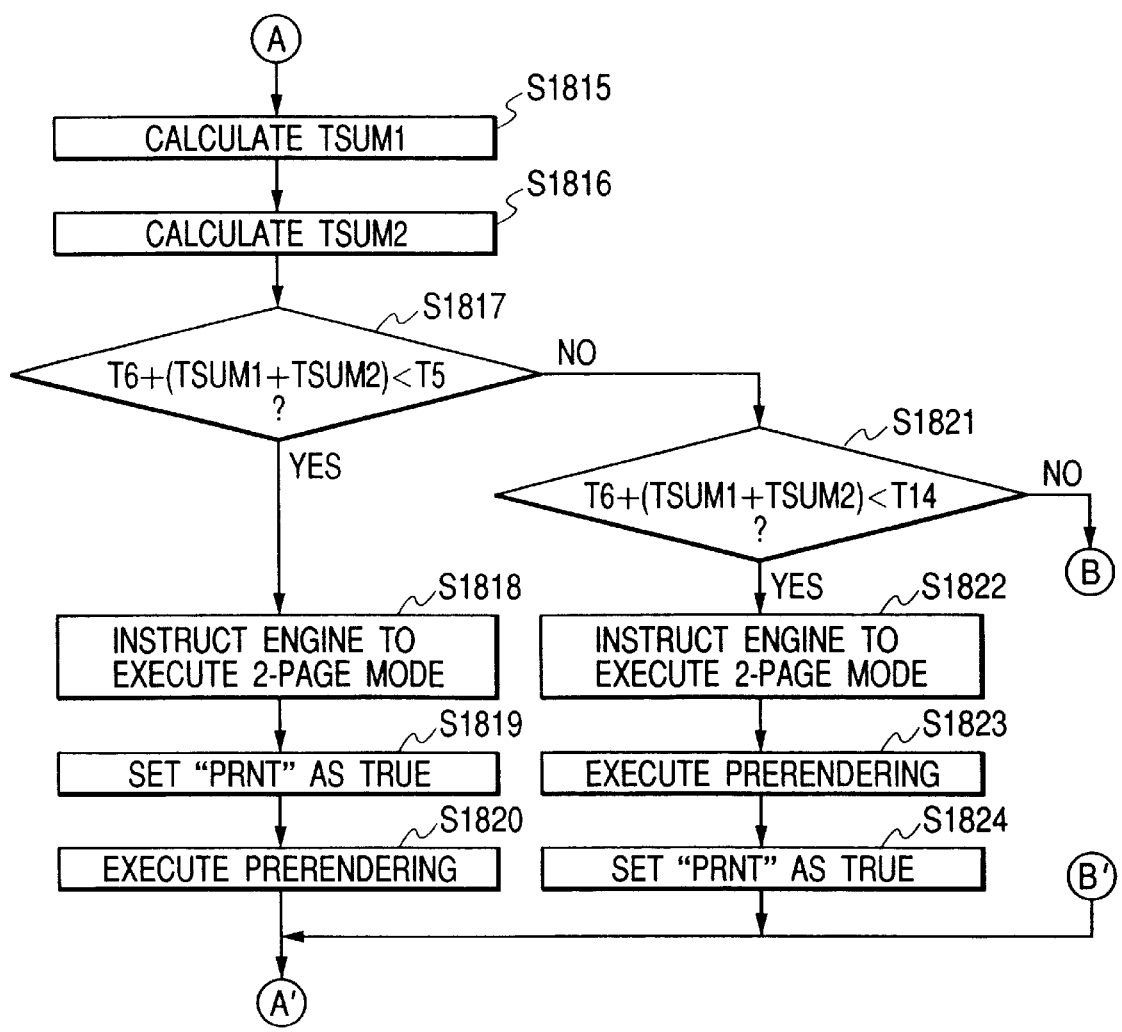
FIG. 19 is a flowchart showing an example of the third data processing procedure in the print control apparatus according to the embodiment.
Figure 20:
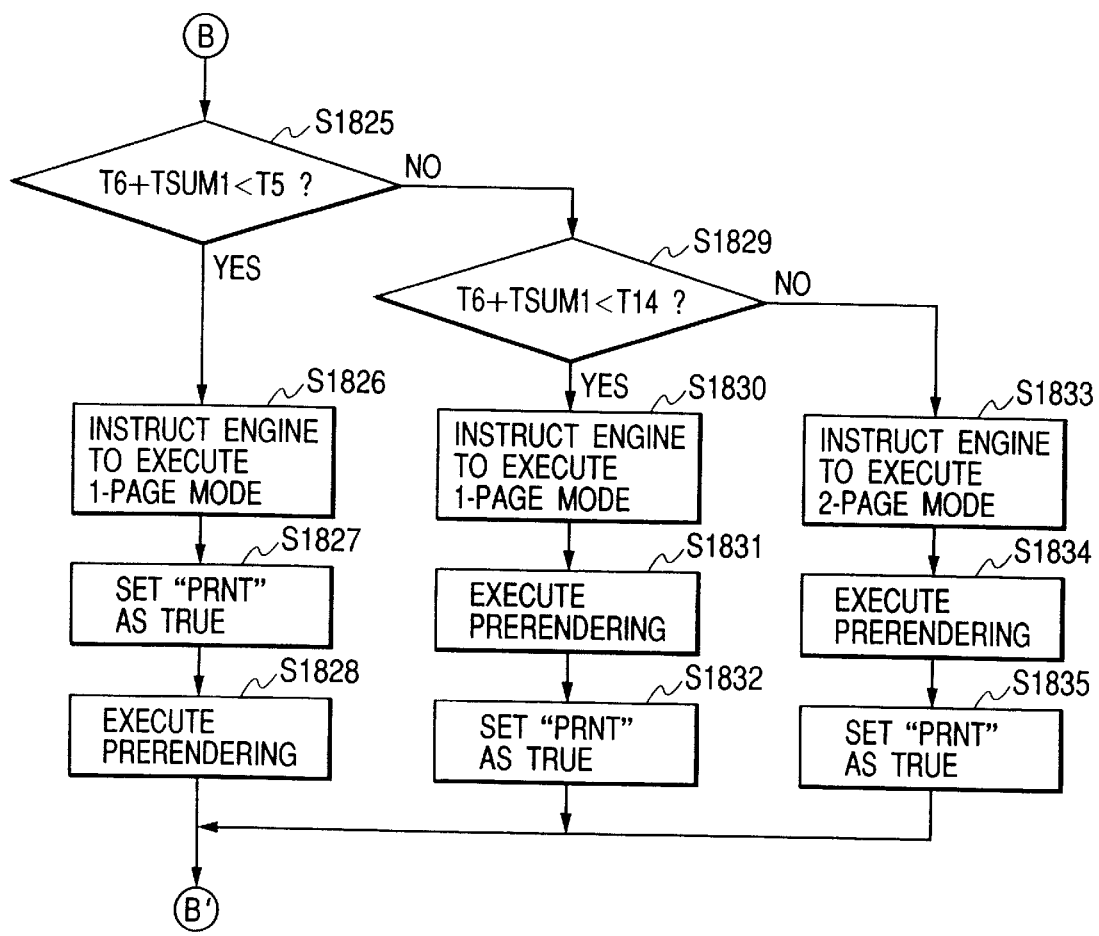
FIG. 20 is a flowchart showing an example of the third data processing procedure in the print control apparatus according to the embodiment.

FIGS. 18 to 20 are flowcharts showing an example of the third data processing procedure in the print control apparatus according to the embodiment and correspond to the detailed procedure of the page handling task shown in FIG. 8. S1801 to S1835 denote processing steps, respectively.

When the page handling task is activated at the time of power-on, it monitors the page queue at a predetermined period. In step S1801, when the page handling task detects that the page N in a state of ("development completed" flag=ON) and ("print start" flag=OFF) exists in the page queue, the presence or absence of the page M as a next page and the "development completed" flag are discriminated (step S1802). If it is determined that the page M does not exist, a time TSUM1 that is required for the preceding development of the page N is calculated (S1803). The page handling task subsequently discriminates whether the engine 103 is continuously printing or not and whether T6+TSUM1<T5 or not (S1804). If it is decided that T6+TSUM1>T5, the 1-page mode is instructed to the engine 103 (S1808) and the preceding band development is performed (S1809). After the development, the PRNT signal is set to "TRUE" (S1810).

In this case, the time that is required for the preceding development is (T12=TSUM1) as shown in FIG. 17 and T13 relates to the case of "pattern 4" of the time that is required until the TOP signal is set to "TRUE" by using the time when the PRNT signal is set to "TRUE" as a start point.

When the page handling task determines that T6+TSUM1<T5 in step (S1804), the 1-page mode is instructed to the engine 103 (S1805), the PRNT signal is set to "TRUE" (S1806), and thereafter, the preceding band development is performed (S1807).

In this case, the time that is required for the preceding development is (T10=TSUM1) as shown in FIG. 17 and T11 relates to the case of "pattern 3" of the time (TOP interval in the 1-page mode) that is required until the TOP signal is set to "TRUE" by using the time when the PRNT signal is set to "TRUE" as a start point.

When it is decided that the page M exists in step (S1802), since the CPU is shifted to the 2-page mode as shown in the first embodiment, the processing routine advances to a flow shown in FIG. 19. The page handling task calculates the time TSUM1 that is required for the preceding development of the page N (S1815) and calculates a time TSUM2 that is required for the preceding development of the page M (S116).

The page handling task subsequently discriminates whether T6+(TSUM1+TSUM2)<T5 is satisfied or not (S1817). When it is determined that T6+(TSUM1+TSUM2)<T5 is satisfied, the 2-page mode is instructed to the engine 103 (S118), the PRNT signal is set to "TRUE" (S1819), and thereafter, the development of the preceding band is performed (S1820).

As shown in FIG. 16, this case corresponds to the case of "pattern 1" in which the PRNT signal is set to "TRUE", the continuation of the continuous printing is instructed to the engine 103, and the printing can be started in the shortest time T5.

When it is decided in step (S1817) that T6+(TSUM1+TSUM2)>T5, the page handling task discriminates whether T6+(TSUM1+TSUM2)<T14 is satisfied or not (S1821). When it is determined that T6+(TSUM1+TSUM2)<T14 is satisfied, the 2-page mode is instructed to the engine 103 (S1822), the development of the preceding band is performed (S1823), and the PRNT signal is set to "TRUE" (S1824) after the development.

Thus, like a pattern 2 shown in FIG. 16, if the previous page is in the 1-page mode, since the definition of the times T3 and T4 is as mentioned above, there is a possibility such that the TOP signal in this case is later than the time T5. However, since the system does not shift to the idling state, the remarkable deterioration of the throughput can be prevented.

When T6+(TSUM1+TSUM2)>T5 in step (S1817) is satisfied and, further, T6+(TSUM1+TSUM2)>T14 is satisfied in step (S1821), it is decided that the 2-page mode is impossible, and the system is shifted to the 1-page mode, so that the processing routine advances to a flow shown in FIG. 20. The page handling task discriminates whether T6+TSUM1<T5 is satisfied or not (S1825). When it is decided that T6+TSUM1<T5 is satisfied, the 1-page mode is instructed to the engine 103 (S1826). The PRNT signal is set to "TRUE" (S1827). The development of the preceding band is performed (S1828). The processing routine is returned to step (S1811). It corresponds to the pattern 3 shown in FIG. 17.

When it is determined in step (S1825) that T6+TSUM1>T5, the page handling task discriminates whether T6+TSUM1<T14 is satisfied or not (S1829). If it is determined that T6+TSUM1<T14 is satisfied, the 1-page mode is instructed to the engine 103 (S1830). The development of the preceding band is performed (S1831). The PRNT signal is set to "TRUE" (S1832) after the development. The processing routine is returned to step (S1811). It corresponds to the pattern 4 shown in FIG. 17.

When it is determined in step (S1829) that T6+TSUM1>T14, since the remarkable deterioration of the throughput cannot be prevented even in the formation of one page, the 2-page mode is instructed to the engine 103 (S1833). The development of the preceding band is performed (S1834). The PRNT signal is set to "TRUE" (S1835) after the development. The processing routine is returned to step (S1811). It corresponds to the pattern 2 shown in FIG. 16.

The system subsequently waits until the TOP signal is set to "TRUE" (S1811). When the TOP signal is set to "TRUE", the DMA controller 308 and engine I/F 306 are activated (S1812), thereby starting the image transfer. Further, the time at that time point is stored as final print start time (S113). Moreover, the transmission task is activated (S1814). The processing routine is returned to step (S1801). Processes of the next page are executed.

Figure 21:
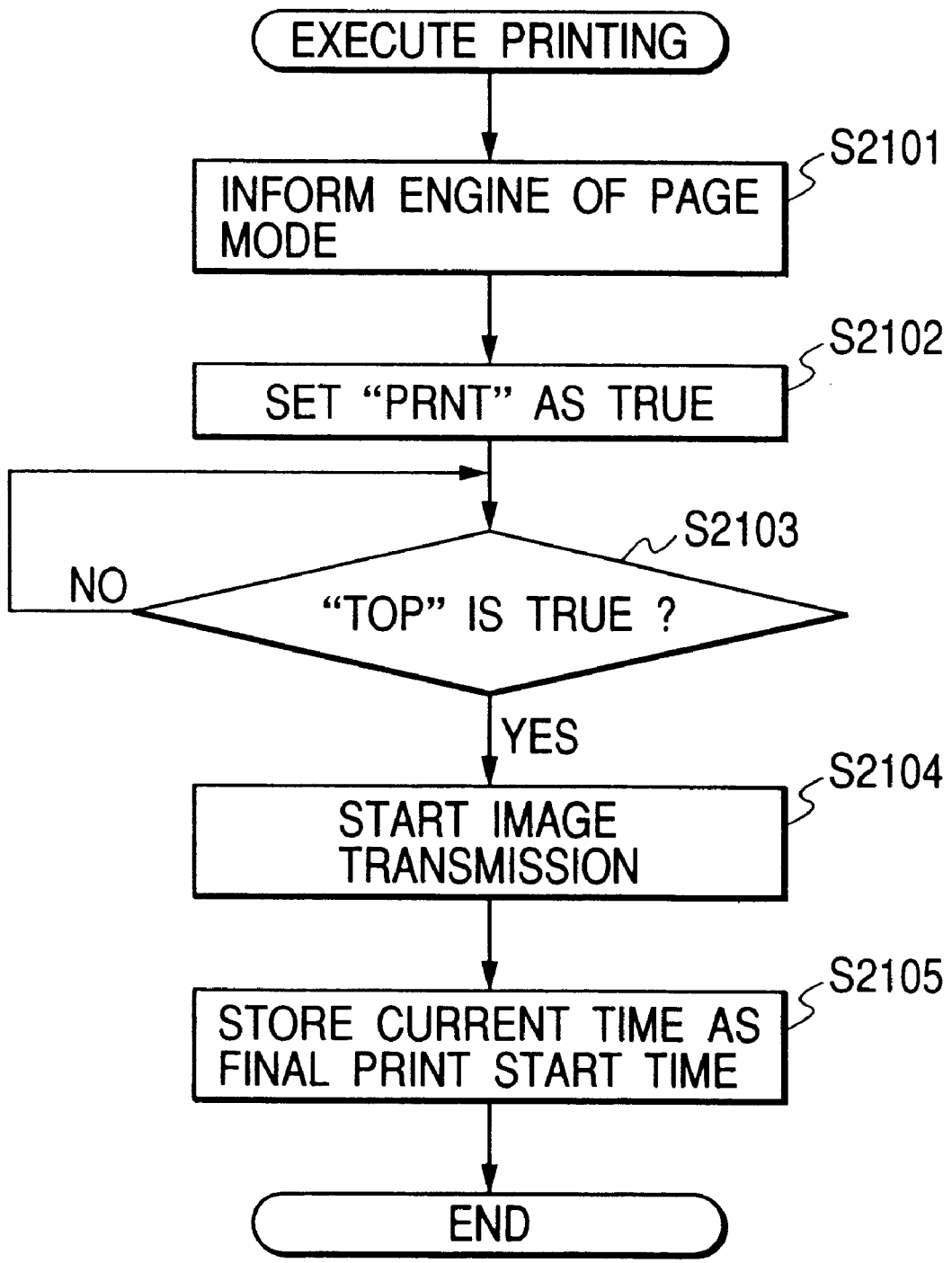
FIG. 21 is a flowchart showing an example of a fourth data processing procedure in the print control apparatus according to the embodiment.
Figure 23:
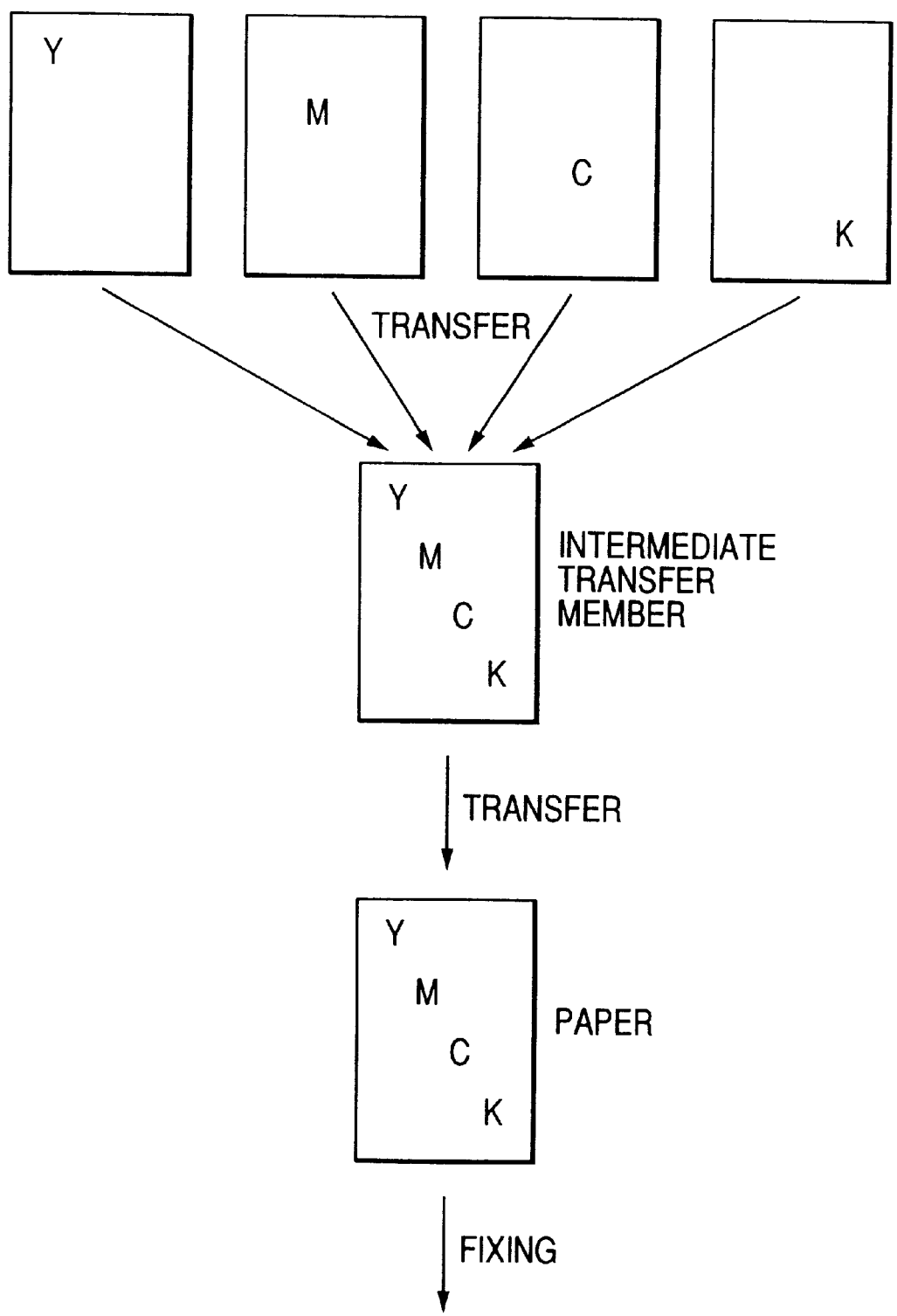
FIG. 23 is an explanatory diagram of an intermediate transfer system according to a conventional technique.
Figure 24A:
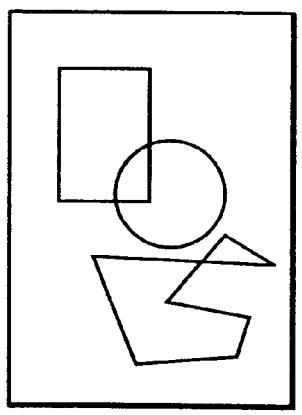
FIGS. 24A and 24B are explanatory diagrams for explaining a problem of the intermediate transfer system according to the conventional technique.
Figure 24A:
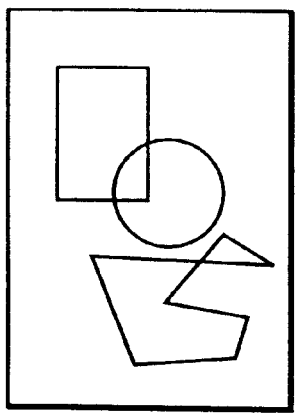
Figure 24B:
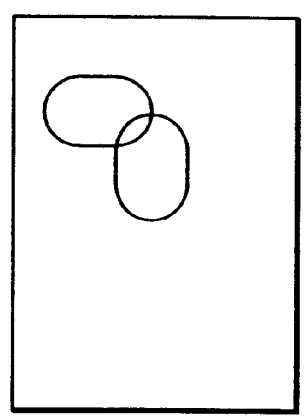
Figure 24B:
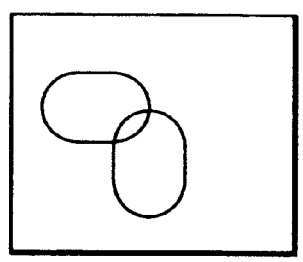

FIG. 21 is a flowchart showing an example of a print execution processing procedure in the print control apparatus according to the embodiment and corresponds to a detailed procedure of a print executing routine. S2101 to S2105 denote processing steps, respectively.

The print executing routine notifies the engine 103 of the page forming mode (S2101), sets the PRNT signal to "TRUE" (S2102), and waits until the TOP signal is set to "TRUE" (S2103). When it is detected that the TOP signal is set to "TRUE", the DMA controller 308 and engine I/F 306 are activated, thereby starting the image transfer (S2104). Further, the time at that time point is stored as final print start time into a predetermined area in the RAM 307 (S2105). The processing routine is finished. The final print start time becomes a calculation reference of T6 and T5 at the next page.

As mentioned above, in the 2-page mode, by coupling the band processes as many as two pages and discriminating, the maximum throughput of the print due to the banding can be derived.

The print control apparatus according to the embodiment is effective in a printing apparatus of the electrophotographic system in which toner images of a plurality of pages are formed before a toner image is transferred onto a paper.

Therefore, even in a monochromatic laser beam printer, it is effective so long as it is an image forming apparatus of the foregoing system.

The print control apparatus in the embodiment is not limited to the printing apparatus of the intermediate transfer system but is also valid even in a system such that a print paper (recording medium) is adhered onto the conventional transfer drum and a toner image is formed on the print paper. In this case, particularly, by using a structure such that the paper is previously fed, the print paper is stopped at a predetermined position, and the paper is fed from the predetermined position to the transfer drum by a paper feed signal, an image can be formed synchronously with the timing similar to that in case of the intermediate transfer system, so that it is effective.

According to the embodiment, by providing the mode such that when the paper length is equal to or shorter than ½ of the maximum paper size, toner images as many as a plurality of pages are formed onto the intermediate transfer member, when the maximum number of images which can be formed per minute is increased, the development processing time of each band in the banding mode is predicted, the page forming mode is determined in accordance with the predicted time and the conditions to maintain the throughput of the printer engine, the order of the band development and the print start is switched in accordance with the conditions to maintain the continuous image formation of the engine, and an image is formed. Therefore, the maximum image formation throughput of the intermediate transfer system can be derived. Together with the color deviation preventing effect, a color image formation in which both the print quality and the printing speed are satisfied can be performed.

The image forming throughput of the intermediate transfer system according to the banding image formation can be raised.

A construction of a data processing program which can be read out by a printing system to which the print control apparatus according to the invention can be applied will now be described hereinbelow with reference to a memory map shown in FIG. 22.

FIG. 22 is a diagram for explaining a memory map of a storage medium to store various data processing programs which can be read out by a print system to which the print control apparatus according to the invention can be applied.

Although not particularly shown, information to manage the programs which are stored on the storage medium, for example, version information, the names of persons who made the programs, and the like are also stored on the storage medium. There is also a case where information depending on the OS or the like on the program reading side, for example, an icon or the like to identify and display the program is stored.

Further, data depending on various programs is also managed in the directory. There are also a case where a program to install various programs into a computer is stored and a case where, if the program to install has been compressed, a program to decode it or the like is also stored.

The functions shown in FIGS. 10 to 12, 13 and 14, 18 to 20, and 21 in the embodiment can be executed by a host computer in accordance with a program which is installed from the outside. In this case, the invention can be applied even to a case where information including the programs is supplied to an output apparatus by a storage medium such as CD-ROM, flash memory, FD, or the like or from an external storage medium through a network.

The objects of the invention can be accomplished by a method whereby a storage medium on which program codes of software to realize the foregoing functions of the embodiments have been recorded is supplied to a system or an apparatus and a computer (or a CPU or an MPU) of the system or apparatus reads out and executes the program codes stored in the storage medium.

In this case, the program codes themselves read out from the storage medium realize the novel functions of the invention and a storage medium in which the program codes have been stored constructs the invention.

As a storage medium to supply the program codes, for example, it is possible to use any of a floppy disk, a hard disk, an optical disk, a magnetooptic disk, a CD-ROM, a CD-R, a magnetic tape, a non-volatile memory card, an ROM, an EEPROM, and the like.

The invention incorporates not only a case where the functions of the embodiments mentioned above are realized by executing the program codes read out by the computer but also a case where an OS (Operating System) or the like which operates on the computer executes a part or all of the actual processes on the basis of instructions of the program codes and the functions of the embodiments mentioned above are realized by those processes.

The invention also incorporates a case where the program codes read out from the storage medium are written into a memory equipped in a function expanding board inserted in a computer or a function expanding unit connected to the computer and, thereafter, a CPU or the like provided for the function expanding board or function expanding unit executes a part or all of the actual processes on the basis of instructions of the program codes, and the foregoing functions of the embodiments are realized by those processes.

According to the invention as described above, the image forming apparatus comprises: the image forming means which can form images of a plurality of pages based on print data received from an external apparatus in an image forming area; the predicting means for calculating prediction information, on a page unit basis, to predict a development processing time for developing intermediate data based on the print data to a bit map image; and the first control means for switching the first forming mode to form an image of one page by the image forming means and the second forming mode to form images of a plurality of pages by the image forming means on the basis of the prediction information calculated by the predicting means and allowing the image formation to be performed. Therefore, the images as many as two pages are formed in a lump by the image forming means from the development processing time of each page which is predicted, the image is formed on a page unit basis, or the number of image forming pages according to complexity of the print data is dynamically changed, thereby enabling a total throughput to be remarkably improved.

According to the invention, the control means switches the forming mode to the first forming mode or the second forming mode in accordance with a discrimination result about whether the image forming mode at the switching timing is the first forming mode or the second forming mode and allows the image formation to be performed, so that the image forming mode corresponding to the image forming mode of the preceding page is selected, thereby enabling the proper image forming mode to be easily selected.

According to the invention, the image forming apparatus further has the accumulating means which can accumulate the intermediate data as much as plural pages that is obtained by analyzing the print data received from the external apparatus, and the control means switches the forming mode to the second forming mode in the case where intermediate data of at least two or more pages in which images can be continuously formed has been accumulated in the accumulating means, so that the print throughput can be improved wastelessly.

According to the invention, the image forming apparatus comprises: the discriminating means for discriminating whether the development processing time of each band of each page which was predicted by the predicting means exceeds a continuous image forming interval relative to the image forming means or not; and the second control means for switching the first starting mode to start the image formation after completion of the development of the band in which the development processing time of the band is not in time corresponding to the image formation processing speed which is set in the image forming means and the second starting mode to start the development of each band after the start of the image formation on the basis of the discrimination result of the discriminating means. Therefore, when the development processing time of each band does not exceed the continuous image forming interval relative to the image forming means, the image formation in the first starting mode which can maintain the continuous image formation can be continued and the images can be formed at the maximum throughput.

According to the invention, since the continuous image forming interval is set to the time from the transfer start timing of the image data of the page which was image formed in accordance with the image forming mode of just before to the start of the image formation, whether the development processing time is always in time corresponding to the image forming timing of a high throughput or not can be properly discriminated.

What is claimed is:

1. An image forming apparatus comprising:
   image forming means for forming images of up to a plurality of pages based on print data received from an external apparatus in an image forming area;
   predicting means for calculating prediction information, on a page unit basis, to predict a development processing time to develop intermediate data based on said print data to a bit map image; and
   control means for switching between a first forming mode to form an image of one page by said image forming means and a second forming mode to form images of a plurality of pages by said image forming means, said control means switching on the basis of the prediction information calculated by said predicting means, whereafter image formation is performed.

2. An apparatus according to claim 1, wherein said control means switches an image forming mode to said first forming mode or said second forming mode in accordance with a discrimination result about whether the image forming mode at the switching timing is said first forming mode or said second forming mode, thereby allowing the image formation to be performed.

3. An apparatus according to claim 1, further comprising accumulating means for accumulating said intermediate data of up to a plurality of pages that is obtained by analyzing the print data received from said external apparatus, and wherein said control means includes first switching means for switching said image forming mode to said second forming mode in the case where the intermediate data of at least two or more pages in which the image formation can be continuously performed has been accumulated in said accumulating means.

4. An apparatus according to claim 1, wherein said intermediate data is converted to data for each of a plurality of color components and said image forming means overlays and holds a toner image formed for each of the plurality of color components onto a charging medium and transfers them together to a recording medium, thereby forming a full color image.

5. An apparatus according to claim 1, wherein said image forming means has an idling state where the image formation is not performed and a printing state where the image formation is performed and executes the image formation in accordance with a time condition until a print start to keep the printing state.

6. An apparatus according to claim 4, further comprising transporting means for transporting the recording medium to said charging medium,
   and wherein said control means allows said transporting means to continuously transport a plurality of recording media to said charging medium in said second forming mode.

7. An apparatus according to claim 1, wherein said control means discriminates whether images of a plurality of pages with serial page numbers can be formed in said second forming mode or not.

8. An apparatus according to claim 1, wherein said control means discriminates whether images of a plurality of pages with non-serial page numbers can be formed in said second forming mode or not.

9. An apparatus according to claim 1, wherein said predicting means predicts the development processing time to develop the intermediate data to the bit map image on a band unit basis, and a band in which said development processing time is longer than a predetermined time is previously developed to a bit map image.

10. An apparatus according to claim 1, further comprising:
    discriminating means for discriminating whether a development processing time of each of a plurality of bands of each page predicted by said predicting means exceeds a continuous image forming interval relative to said image forming means or not; and
    second control means for switching between a first starting mode to start the image formation after completion of the development of the band in which the development processing time of said band is not in time corresponding to an image formation processing speed set in said image forming means and a second starting mode to start the development of each band after the start of the image formation, said second control means switching on the basis of a discrimination result of said discriminating means.

11. An apparatus according to claim 10, wherein said continuous image forming interval is set to a time from a transfer start timing of the image data of the page whose image was formed in accordance with the image forming mode of just before to a start of the image formation.

12. An image forming apparatus comprising:
    image forming means for forming images of a plurality of pages based on print data received from an external apparatus in an image forming area;
    predicting means for calculating prediction information, on a page unit basis, to predict a development processing time to develop intermediate data based on said print data to a bit map image; and control means for switching between a first forming mode for outputting a signal to request the image formation after a band of intermediate data has been developed in which a development processing time of the band is not in time corresponding to an image formation processing speed in said image forming means and a second forming mode to start the development of the band in which the development processing time of the band is not in time corresponding to an image formation processing speed in said image forming means after the output of said signal to request the image formation, said control means switching on the basis of the prediction information calculated by said prediction means, whereafter image formation is performed.

13. An image forming method comprising:

a predicting step of calculating prediction information, on a page unit basis, to predict a development processing time to develop intermediate data based on print data received from an external apparatus to a bit map image;

a control step of switching between a first forming mode to form an image of one page and a second forming mode to form images of a plurality of pages on the basis of the prediction information calculated in said predicting step; and an image forming step of forming images according to the forming mode switched to in said control step.

14. A method according to claim 13, wherein in said control step, an image forming mode is switched to said first forming mode or said second forming mode in accordance with a discrimination result about whether the image forming mode at the switching timing is said first forming mode or said second forming mode, thereby allowing the image formation to be performed.

15. A method according to claim 13, further comprising an accumulating step of enabling said intermediate data of up to a plurality of pages that is obtained by analyzing the print data received from said external apparatus to be accumulated, and wherein said control step includes a first switching step of switching said image forming mode to said second forming mode in the case where the intermediate data of at least two or more pages in which the image formation can be continuously performed has been accumulated in said accumulating step.

16. A method according to claim 13, wherein said intermediate data is converted to data for each of a plurality of color components and, in said image forming step, a toner image formed for each of the plurality of color components is overlaid and held onto a charging medium, and the toner images are transferred together to a recording medium, thereby forming a full color image.

17. A method according to claim 13, wherein said image forming step has an idling state where the image formation is not performed and a printing state where the image formation is performed, and the image formation is performed in accordance with a time condition until a print start to keep the printing state.

18. A method according to claim 16, further comprising a transporting step of transporting the recording medium to said charging medium, and wherein said control step allows said transporting step to continuously transport a plurality of recording media to said charging medium in said second forming mode.

19. A method according to claim 13, wherein whether images of a plurality of pages with serial page numbers can be formed in said second forming mode or not is discriminated in said control step.

20. A method according to claim 13, wherein whether images of a plurality of pages with non-serial page numbers can be formed in said second forming mode or not is discriminated in said control step.

21. A method according to claim 13, wherein in said predicting step, the development processing time to develop the intermediate data to the bit map image is predicted on a band unit basis, and a band in which said development processing time is longer than a predetermined time is previously developed to a bit map image.

22. A method according to claim 13, further comprising:

a discriminating step of discriminating whether a development processing time of each of a plurality of bands of each page predicted by said predicting step exceeds a continuous image forming interval relative to said image forming step or not; and a second control step of switching between a first starting mode to start the image formation after completion of the development of the band in which the development processing time of said band is not in time corresponding to an image formation processing speed set in said image forming step and a second starting mode to start the development of each band after the start of the image formation, said control step switching on the basis of a discrimination result of said discriminating step.

23. A method according to claim 22, wherein said continuous image forming interval is set to a time from a transfer start timing of the image data of the page whose image was formed in accordance with the image forming mode of just before to a start of the image formation.

24. An image forming method comprising:

a predicting step of calculating prediction information, on a page unit basis, to predict a development processing time to develop intermediate data based on print data received from an external apparatus to a bit map image;

a control step of switching between a first forming mode for outputting a signal to request the image formation after a band of intermediate data has been developed in which a development processing time of the band is not in time corresponding to an image formation processing speed in said image forming step and a second forming mode to start the development of the band in which the development processing time of the band is not in time corresponding to an image formation processing speed in said image forming step after the output of said signal to request the image formations said control step switching on the basis of the prediction information calculated in said predicting step; and an image forming step of forming images according to the forming mode switched to in said control step.

25. A computer-readable storage medium which stores a program for an image forming method, wherein said program comprises:

a predicting step of calculating prediction information, on a page unit basis, to predict a development processing time to develop intermediate data based on print data received from an external apparatus to a bit map image;

a control step of switching between a first forming mode to form an image of one page and a second forming mode to form images of a plurality of pages, said control step switching on the basis of the prediction information calculated in said predicting step; and an image forming step of forming images according to the forming mode switched to in said control step.

26. A medium according to claim 25, wherein in said control step, an image forming mode is switched to said first forming mode or said second forming mode in accordance with a discrimination result about whether the image forming mode at the switching timing is said first forming mode or said second forming mode, thereby allowing the image formation to be performed.

27. A medium according to claim 25, wherein said program further comprises an accumulating step of enabling said intermediate data of up to a plurality of pages that is obtained by analyzing the print data received from said external apparatus to be accumulated, and said control step includes a first switching step of switching said image forming mode to said second forming mode in the case where the intermediate data of at least two or more pages in which the image formation can be continuously performed has been accumulated in said accumulating step.

28. A medium according to claim 25, wherein said intermediate data is converted to data for each of a plurality of color components and, in said image forming step, a toner image formed for each of the plurality of color components is overlaid and held onto a charging medium, and the toner images are transferred together to a recording medium, thereby forming a full color image.

29. A medium according to claim 25, wherein said image forming step has an idling state where the image formation is not performed and a printing state where the image formation is performed, and the image formation is performed in accordance with a time condition until a print start to keep the printing state.

30. A medium according to claim 28, wherein said program further comprises a transporting step of transporting the recording medium to said charging medium, and said control step allows said transporting step to continuously transport a plurality of recording media to said charging medium in said second forming mode.

31. A medium according to claim 25, wherein whether images of a plurality of pages with serial page numbers can be formed in said second forming mode or not is discriminated in said control step.

32. A medium according to claim 25, wherein whether images of a plurality of pages with non-serial page numbers can be formed in said second forming mode or not is discriminated in said control step.

33. A medium according to claim 25, wherein in said predicting step, the development processing time to develop the intermediate data to the bit map image is predicted on a band unit basis, and a band in which said development processing time is longer than a predetermined time is previously developed to a bit map image.

34. A medium according to claim 25, wherein said program further comprises:

a discriminating step of discriminating whether the development processing time of each of a plurality of bands of each page predicted by said predicting step exceeds a continuous image forming interval relative to said image forming step or not; and a second control step of switching between a first starting mode to start the image formation after completion of the development of the band in which the development processing time of said band is not in time corresponding to an image formation processing speed set in said image forming step and a second starting mode to start the development of each band after the start of the image formation, said control step switching on the basis of a discrimination result of said discriminating step.

35. A medium according to claim 34, wherein said continuous image forming interval is set to a time from a transfer start timing of the image data of the page whose image was formed in accordance with the image forming mode of just before to a start of the image formation.

36. A computer-readable storage medium which stores a program for an image forming method, wherein said program comprises:

a predicting step of calculating prediction information, on a page unit basis, to predict a development processing time to develop intermediate data based on print data received from an external apparatus to a bit map image;

a control step of switching between a first forming mode for outputting a signal to request the image formation after a band of intermediate data has been developed in which a development processing time of the band is not in time corresponding to an image formation processing speed in said image forming step and a second forming mode to start the development of the band in which the development processing time of the band is not in time corresponding to an image formation processing speed in said image forming step after the output of said signal to request the image formation, said control step switching on the basis of the prediction information calculated in said predicting step; and an image forming step of forming images according to the forming mode switched to in said control step.

* * * * *

UNITED STATES PATENT AND TRADEMARK OFFICE
CERTIFICATE OF CORRECTION

PATENT NO. : 6,266,497 B1  Page 1 of 1
DATED : July 24, 2001
INVENTOR(S) : Shinichiro Maekawa It is certified that error appears in the above-identified patent and that said Letters Patent is hereby corrected as shown below:

Column 1,
Line 66, "object," should read -- object, according to the invention of claim 1, --.

Column 15,
Line 49, "(S116)." should read -- (S1816). --; and
Line 55, "(S118)," should read -- (S1818), --.

Column 16,
Line 48, "(S113)." should read -- (S1813). --.

Signed and Sealed this

Eleventh Day of June, 2002

*Attest:*

JAMES E. ROGAN
*Attesting Officer*  *Director of the United States Patent and Trademark Office*